(12) United States Patent
Fujinami et al.

(10) Patent No.: US 6,385,152 B1
(45) Date of Patent: May 7, 2002

(54) RECORDING/PLAYBACK APPARATUS, RECORDING/PLAYBACK METHOD, PRESENTATION MEDIUM AND RECORDING MEDIUM

(75) Inventors: Yasushi Fujinami, Tokyo; Toshiya Hamada, Saitama, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/296,733

(22) Filed: Apr. 22, 1999

(30) Foreign Application Priority Data

Apr. 24, 1998 (JP) .......................................... 10-114567

(51) Int. Cl.$^7$ ................................................. G11B 5/09
(52) U.S. Cl. ................. 369/53.2; 369/53.21; 369/47.54
(58) Field of Search ............................ 369/53.2, 53.21, 369/53.24, 53.32, 53.41, 53.31, 47.13, 47.54

(56) References Cited

U.S. PATENT DOCUMENTS

| 5,023,854 A | | 6/1991 | Satoh et al. | |
|---|---|---|---|---|
| 5,457,674 A | * | 10/1995 | Watanabe et al. | 369/53.3 |
| 5,481,519 A | * | 1/1996 | Hosoya | 369/53.21 |
| 5,559,778 A | * | 9/1996 | Inokuchi et al. | 369/53.24 |
| 6,154,817 A | * | 11/2000 | Mohan et al. | 711/162 |
| 6,188,650 B1 | * | 2/2001 | Hamada et al. | 369/32 |

FOREIGN PATENT DOCUMENTS

| EP | 0 406 021 | 1/1991 |
|---|---|---|
| EP | 0 542 730 | 5/1993 |
| EP | 0 676 761 | 10/1995 |
| EP | 0 694 918 | 1/1996 |
| EP | 0 911 825 | 4/1999 |
| GB | 2 219 886 | 12/1989 |

* cited by examiner

*Primary Examiner*—Thang V. Tran
(74) *Attorney, Agent, or Firm*—Frommer Lawrence & Haug LLP; William S. Frommer

(57) ABSTRACT

With append_only_flag reset to 0, data is recorded over existing data on a disc in accordance with the value of volume_write_protect_level. With append_only_flag set to 1, on the other hand, data can not be recorded over existing data on the disc but can be appended to already recorded data in a range defined by the value of volume_write_protect_level. As a result, it is possible to prevent new data from being written over already recorded data by mistake and to utilize the recording area of the disc efficiently.

6 Claims, 28 Drawing Sheets

FIG. 2

| Syntax | Number of Bits | Mnemonic |
|---|---|---|
| VOLUME.TOC{ | | |
|     file_type_id | 8*16 | char[16] |
|     volume_information() | | |
|     text_block() | | |
| } | | |

FIG. 3

| Syntax | Number of Bits | Mnemonic |
|---|---|---|
| volume_information() { | | |
|     volume_attribute() | | |
|     resume() | | |
|     volume_rating() | | |
|     write_protect() | | |
|     play_protect() | | |
|     recording_timer() | | |
| } | | |

FIG. 4

| Syntax | Number of Bits | Mnemonic |
|---|---|---|
| volume_attribute() { | | |
|     volume_attribute_length | 32 | uimsbf |
|     vdr_version | 4*4 | bcd |
|     reserved | 6 | bslbf |
|     title_playback_mode_flag | 1 | bslbf |
|     program_playback_mode_flag | 1 | bslbf |
|     volume_play_time() | 4*8 | bcd |
|     update_time_count() | 32 | uimsbf |
|     maker_id | 8*16 | char[16] |
|     model_code | 8*16 | char[16] |
|     POSID | 32 | bslbf |
| } | | |

FIG. 5

| Syntax | Number of Bits | Mnemonic |
|---|---|---|
| resume() { | | |
|     resume_length | 32 | uimsbf |
|     reserved    // for byte alignment | 3 | bslbf |
|     resume_switch | 1 | bit |
|     reserved | 4 | bslbf |
|     number_of_records | 4 | uimsbf |
|     reserved    // for byte alignment | 7 | bslbf |
|     resume_auto_execute_time_flag | 1 | bit |
|     resume_auto_execute_time() | 4*14 | bcd |
|     reserved | 4 | bslbf |
|     resume_auto_execute_record_number | 4 | uimsbf |
|     for(i=0;i<number_of_records;i++) { | | |
|         resume_mode_flag | 4 | bslbf |
|         object_type | 4 | bslbf |
|         linked_record_number | 4 | uimsbf |
|         number_of_times | 16 | uimsbf |
|         resume_updated_time() | 4*14 | bcd |
|         switch(object_type) { | | |
|             case title: | | |
|                 title_number | 16 | uimsbf |
|                 title_local_time_stamp | 64 | uimsbf |
|                 break; | | |
|             case program: | | |
|                 program_number | 16 | uimsbf |
|                 program_local_time_stamp | 64 | uimsbf |
|                 break; | | |
|             case program_bind; | | |
|                 program_bind_number | 16 | uimsbf |
|                 program_order | 16 | uimsbf |
|                 program_number | 16 | uimsbf |
|                 program_local_time_stamp | 64 | uimsbf |
|                 break; | | |
|             case play_item: | | |
|                 play_item_number | 16 | uimsbf |
|                 play_item_local_time_stamp | 64 | uimsbf |
|                 break | | |
|         } | | |
|     } | | |
| } | | |

FIG. 6

| Syntax | Number of Bits | Mnemonic |
|---|---|---|
| volume_rating() { | | |
|     volume_rating_id | 8*16 | char[16] |
|     volume_rating_length | 32 | uimsbf |
|     reserved | 6 | bslbf |
|     volume_rating_type | 2 | bslbf |
|     volume_rating_password | 128 | bslbf |
|     switch(volume_rating_type) { | | |
|         case age_limited: | | |
|             number_of_rating | 8 | uimsbf |
|             for(i=0;i<number_of_rating;i++) { | | |
|                 country_code_for_rating | 24 | bslbf |
|                 age_for_volume_rating | 8 | uimsbf |
|             } | | |
|             break; | | |
|         case CARA: | | |
|             reserved | 4 | bslbf |
|             CARA_category | 4 | bslbf |
|             reserved | 24 | bslbf |
|             break; | | |
|         case RSAC: | | |
|             reserved | 4 | bslbf |
|             RSAC_category | 4 | bslbf |
|             reserved | 4 | bslbf |
|             RSAC_level | 4 | bslbf |
|             reserved | 16 | bslbf |
|             break; | | |
|     } | | |
| } | | |

FIG. 7

| Syntax | Number of Bits | Mnemonic |
|---|---|---|
| write_protect() { | | |
|     write_protect_length | 32 | uimsbf |
|     volume_write_protect_level | 4 | uimsbf |
|     password_enable_flag | 1 | bslbf |
|     append_only_flag | 1 | bslbf |
|     expiration_time_enable_flag | 1 | bslbf |
|     number_of_times_enable_flag | 1 | bslbf |
|     password_for_volume_write_protect | 128 | bslbf |
|     reserved | 8 | bslbf |
|     write_protect_set_time() | 56 | bcd |
|     reserved | 8 | bslbf |
|     write_protect_expiration_time() | 56 | bcd |
|     number_of_times | 16 | uimsbf |
| } | | |

FIG. 8

| Syntax | Number of Bits | Mnemonic |
|---|---|---|
| play_protect() { | | |
|     play_protect_length | 32 | uimsbf |
|     volume_play_protect_flag | 2 | bslbf |
|     reserved | 2 | bslbf |
|     password_enable_flag | 1 | bslbf |
|     reserved | 1 | bslbf |
|     expiration_time_enable_flag | 1 | bslbf |
|     number_of_times_enable_flag | 1 | bslbf |
|     password_for_volume_play_protect | 128 | bslbf |
|     reserved | 8 | bslbf |
|     play_protect_set_time() | 56 | bcd |
|     reserved | 8 | bslbf |
|     play_protect_expiration_time() | 56 | bcd |
|     number_of_times | 16 | uimsbf |
| } | | |

FIG. 9

| Syntax | Number of Bits | Mnemonic |
|---|---|---|
| recording_timer() { | | |
|     recording_timer_length | | |
|     recording_timer_flag | | |
|     number_of_entry | | |
|     for(i=0; i<number_of_entry; i++) { | | |
|         date_and_time | | |
|         channel | | |
|         program | | |
|         : | | |
|     } | | |
| } | | |

FIG. 10

| Syntax | Number of Bits | Mnemonic |
|---|---|---|
| text_block() { | | |
|     text_block_length | 32 | uimsbf |
|     number_of_language_sets | 8 | uimsbf |
|     number_of_text_items | 16 | uimsbf |
|     for(i=0;i<number_of_language_sets;i++) { | | |
|         language_set() | | |
|     } | | |
|     for(i=0;i<number_of_text_items;i++) { | | |
|         text_item() | | |
|     } | | |
| } | | |

FIG. 11

| Syntax | Number of Bits | Mnemonic |
|---|---|---|
| language_set() { | | |
|     reserved | 8 | bslbf |
|     language_code | 24 | bslbf |
|     character_set_type | 8 | bslbf |
|     number_of_language_set_names | 8 | uimsbf |
|     for(i=0;i<number_of_language_set_names;i++) { | | |
|         character_set_type_for_name | 8 | bslbf |
|         language_set_name_length | 8 | uimsbf |
|         language_set_name | 8*language_set_name_length | bslbf |
|     } | | |
| } | | |

FIG.12

| Syntax | Number of Bits | Mnemonic |
|---|---|---|
| text_item() { | | |
|     text_item_length | 16 | uimsbf |
|     text_item_id | 16 | uimsbf |
|     text_item_sub_id | 16 | uimsbf |
|     flags | 8 | bslbf |
|     number_of_used_language_sets | 8 | uimsbf |
|     //loop for each language set | | |
|     for(i=0;i<number_of_used_language_sets;i++) { | | |
|         language_set_id | 8 | uimsbf |
|         reserved | 4 | bslbf |
|         text_string_length | 16 | uimsbf |
|         text_string | 8*text_string_length | bslbf |
|         bitmap() | | |
|     } | | |
|     stuffing_bytes | 8*n | bslbf |
| } | | |

FIG.13

| Syntax | Number of Bits | Mnemonic |
|---|---|---|
| ALBUM.STR { | | |
|     file_type_id | 8*16 | char[16] |
|     album() | | |
|     text_block() | | |
| } | | |

FIG. 14

| Syntax | Number of Bits | Mnemonic |
|---|---|---|
| album() { | | |
|     album_length | 32 | uimsbf |
|     reserved | 6 | bslbf |
|     volume_status | 1 | bslbf |
|     if(volume_status== "1b") { | | |
|        chief_volume_flag | 1 | bslbf |
|     }else{ | | |
|        reserved | 1 | "0" |
|     } | | |
|     if(volume_status== "1b") { | | |
|        if(chief_volume_flag== "1b") { | | |
|           reserved | 6 | bslbf |
|           album_type | 2 | bslbf |
|           albim_id | 128 | bslbf |
|           number_of_discs_in_album | 16 | uimsbf |
|           number_of_volumes_in_album | 16 | uimsbf |
|           for(i=0; i<number_of_volumes_in_album; i++) { | | |
|              disc_id_for_album_member | 128 | bslbf |
|              volume_id_for_album_member | 128 | bslbf |
|              title_offset_number | 16 | uimsbf |
|           } | | |
|           reserved_for_program_bind | 8 | bslbf |
|           number_of_program_binds | 8 | uimsbf |
|           for(i=0; i<number_of_program_binds; i++) { | | |
|              number_of_programs_in_this_program_bind | 16 | uimsbf |
|              for(i=0; i<number_of_programs_in_this_program_bind; i++) { | | |
|                 disc_id_for_program_bind_member | 128 | uimsbf |
|                 volume_id_for_program_bind_member | 128 | uimsbf |
|                 program_number | 16 | uimsbf |
|              } | | |
|           } | | |
|        }else{    //chief_volume_flag-- "0b" | | |
|           chief_disc_id | 128 | uimsbf |
|           chief_volume_id | 128 | uimsbf |
|           (album_id | 128 | bslbf |
|        } | | |
|     } | | |
| } | | |

FIG. 15

| Syntax | Number of Bits | Mnemonic |
|---|---|---|
| TITLE_###.VDR{ | | |
|     file_type_id | 8*16 | char[16] |
|     title_info() | | |
|     text_block() | | |
| } | | |

FIG. 16

| Syntax | Number of Bits | Mnemonic |
|---|---|---|
| title_info(){ | | |
|     title_info_length | 32 | uimsbf |
|     flags_for_title | 32 | bslbf |
|     cgit_file_id | 16 | uimsbf |
|     title_start_chunk_group_time_stamp | 64 | uimsbf |
|     title_end_chunk_group_time_stamp | 64 | uimsbf |
|     title_playback_time() | 32 | bcd |
|     reserved | 32 | bslbf |
|     number_of_marks | 16 | uimsbf |
|     for(i=0;i<number_of_marks;i++){ | | |
|         reserved | 4 | bslbf |
|         mark_type | 4 | bslbf |
|         mark_chunk_group_time_stamp | 64 | uimsbf |
|     } | | |
|     stuffing_bytes | 8*n | bslbf |
| } | | |

FIG. 17

| Syntax | Number of Bits | Mnemonic |
|---|---|---|
| PROGRAM_$$$.PGI{ | | |
|     file_type_id | 8*16 | char[16] |
|     program() | | |
|     text_block() | | |
| } | | |

FIG. 18

| Syntax | Number of Bits | Mnemonic |
|---|---|---|
| program() { | | |
|     program_length | 32 | uimsbf |
|     flags_for_program | 32 | bslbf |
|     program_status | 4 | bslbf |
|     program_playback_time() | 32 | bcd |
|     reserved | 32 | bslbf |
|     number_of_play_sequences | 16 | uimsbf |
|     for(j=0;j<number_of_play_sequence;j++) { | | |
|         number_of_play_lists | 16 | uimsbf |
|         for(k=0;k<number_of_play_lists;k++) { | | |
|             play_list_start_time_stamp_offset | 64 | uimsbf |
|             play_list(k) | | |
|         } | | |
|     } | | |
|     stuffing_bytes | 8*n | bslbf |
| } | | |

FIG. 19

| Syntax | Number of Bits | Mnemonic |
|---|---|---|
| play_list() { | | |
|     //playback sequence of play items in this play list | | |
|     number_of_play_items | 16 | uimsbf |
|     for(k=0;k<number_of_play_items;k++) { | | |
|         play_item_number | 16 | uimsbf |
|         reserved | 31 | bslbf |
|         seamless_connection_flag | 1 | bslbf |
|     } | | |
|     //play_item_table | | |
|     for(PIN=1;PIN<=number_of_play_items_in_program;PIN++) { | | |
|         play_item() | | |
|     } | | |
| } | | |

FIG. 20

| Syntax | Number of Bits | Mnemonic |
|---|---|---|
| play_item() { | | |
|     play_item_length | 32 | uimsbf |
|     play_item_type | 8 | bslbf |
|     play_mode | 8 | bslbf |
|     total_playback_time() | 32 | bcd |
|     menu_item_number | 16 | uimsbf |
|     return_item_number | 16 | uimsbf |
|     next_item_number | 16 | uimsbf |
|     prev_item_number | 16 | uimsbf |
|     if(play_item_type= "0000b") { | | |
|         //play item for one "cut" | | |
|         title_number | 16 | uimsbf |
|         //IN point | | |
|         item_start_time_stamp | 64 | uimsbf |
|         //OUT point | | |
|         item_end_time_stamp | 64 | uimsbf |
|     } | | |
| } | | |

FIG. 21

| Syntax | Number of Bits | Mnemonic |
|---|---|---|
| CHUNKGROUP_@@@.CGIT{ | | |
|     file_type_id | 8*16 | char[16] |
|     chunkgroup_time_base_flags | 32 | bslbf |
|     chunkgroup_time_base_offset | 64 | uimsbf |
|     chunk_connection_info() | | |
|     text_block() | | |
| } | | |

FIG. 22

| Syntax | Number of Bits | Mnemonic |
|---|---|---|
| chunk_connection_info() { | | |
|     chunk_connection_info_length | 32 | uimsbf |
|     reserved | 16 | bslbf |
|     number_of_chunks | 16 | uimsbf |
|     chunk_sync_play_flag | 8 | bslbf |
|     //chunk info file list | | |
|     for(i=0;i<number_of_chunks;i++) { | | |
|         chunk_arrangement_info() | | |
|     } | | |
| } | | |

FIG. 23

| Syntax | Number of Bits | Mnemonic |
|---|---|---|
| chunk_arrangement_info() { | | |
|     chunk_arrangement_info_length | 32 | uimsbf |
|     chunk_info_file_id | 16 | bslbf |
|     reserved | 5 | bslbf |
|     chunk_switch_stream_id | 16 | bslbf |
|     presentation_start_cg_time_count | 64 | uimsbf |
|     presentation_end_cg_time_count | 64 | uimsbf |
|     reserved | 4 | bslbf |
|     chunk_time_count_type | 4 | bslbf |
|     number_of_start_original_time_count_extension | 8 | uimsbf |
|     number_of_end_original_time_count_extension | 8 | uimsbf |
|     //presentation start position and time | | |
|     presentation_start_original_time_count | 64 | uimsbf |
|     presentation_end_original_time_count | 64 | uimsbf |
|     for(j=0;j<number_of_start_original_time_count_extension;j++) | | |
|         tc_ext_attributes | 16 | bslbf |
|         start_original_time_count_extension | 64 | uimsbf |
|     } | | |
|     //presentation end position and time | | |
|     for(k=0;k<number_of_end_original_time_count_extension;k++){ | | |
|         tc_ext_attributes | 16 | bslbf |
|         end_original_time_count_extension | 64 | uimsbf |
|     } | | |
|     transition_info() | | |
| } | | |

FIG. 24

| Syntax | Number of Bits | Mnemonic |
|---|---|---|
| CHUNK_%%%%.ABST{ | | |
|     file_type_id | 8*16 | char[16] |
|     info_type | 4 | bslbf |
|     reserved | 3 | bslbf |
|     cognizant_recording_indicator | 1 | bslbf |
|     //stream_info() | | |
| | | |
|     if(info_type=="MPEG2_System_TS"){ | | |
|         number_of_programs | 8 | uimsbf |
|     else{ | | |
|         number_of_programs | 8 | '0000 0001' |
|     } | | |
| | | |
|     for(i=0;i<number_of_programs;i++){ | | |
|         number_of_streams | 8 | uimsbf |
|         for(i=0;i<number_of_streams;i++){ | | |
|             stream_identifier | 16 | bslbf |
| | | |
|             //slot type information | | |
|             reserved | 4 | bslbf |
|             slot_unit_type | 4 | bslbf |
|             if(slot_unit_type=="time_stamp"){ | | |
|                 slot_time_length | 32 | uimsbf |
|             }else{ | | |
|                 reserved | 32 | bslbf |
|             } | | |
|             number_of_slots | 32 | uimsbf |
|             number_of_thinned_out_slots | 8 | uimsbf |
| | | |
|             //stream attribute | | |
|             bitstream_attribute() | | |
|         } | | |
| | | |
|         //loop of slot information | | |
|         for(i=0;i<number_of_streams;i++){ | | |
|             slot_info() | | |
|         } | | |
|     } | | |
|     text_block() | | |
| } | | |

FIG. 26

```
/----VOLUME.TOC
    -ALBUM.STR
    -PROGRAM
    |      -PROGRAM_001.PGI
    -TITLE
    |      -TITLE_001.VDR
    |      -TITLE_002.VDR
    |      -TITLE_003.VDR
    |
    -CHUNKGROUP
    |      -CHUNKGROUP_001.CGIT
    |      -CHUNKGROUP_002.CGIT
    |
    -CHUNK
    |      -CHUNK_0001.ABST
    |      -CHUNK_0011.ABST
    |      -CHUNK_0012.ABST
    |
    -MPEGAV
    |      -STREAMS_001
    |      |      -CHUNK_0001.MPEG2
    |      |
    |      -STREAMS_002
    |      |      -CHUNK_0011.MPEG2
    |      |      -CHUNK_0012.MPEG2
```

FIG. 29

```
/------MPEGAV
       |      -STREAMS_003
       |      |      -CHUNK 0031.MPEG2
```

FIG. 30

```
/---VOLUME. TOC
   -ALBUM. STR
   -PROGRAM
   |      -PROGRAM_001. PGI
   -TITLE
   |      -TITLE_001. VDR
   |      -TITLE_002. VDR
   |      -TITLE_003. VDR
   |      -TITLE_004. VDR*
   |
   -CHUNKGROUP
   |      -CHUNKGROUP_001. CGIT
   |      -CHUNKGROUP_002. CGIT
   |      -CHUNKGROUP_003. CGIT*
   |
   -CHUNK
   |      -CHUNK_0001. ABST
   |      -CHUNK_0011. ABST
   |      -CHUNK_0012. ABST
   |      -CHUNK_0031. ABST*
   |
   -MPEGAV
   |      -STREAMS_001
   |      |      -CHUNK_0001. MPEG2
   |      |
   |      -STREAMS_002
   |      |      -CHUNK_0011. MPEG2
   |      |      -CHUNK_0012. MPEG2
   |      |
   |      -STREAMS_003*
   |      |      -CHUNK_0031. MPEG2*
   |      |
```

FIG. 32

```
/------MPEGAV
    |       -STREAMS_002
    |       |      -CHUNK 0031.MPEG2
```

FIG. 33

```
/---VOLUME. TOC
   -ALBUM. STR
   -PROGRAM
   |     -PROGRAM_001. PGI
   -TITLE
   |     -TITLE_001. VDR
   |     -TITLE_002. VDR
   |     -TITLE_003. VDR
   |     -TITLE_004. VDR*
   |
   -CHUNKGROUP
   |     -CHUNKGROUP_001. CGIT
   |     -CHUNKGROUP_002. CGIT
   |
   -CHUNK
   |     -CHUNK_0001. ABST
   |     -CHUNK_0011. ABST
   |     -CHUNK_0012. ABST
   |     -CHUNK_0031. ABST*
   |
   -MPEGAV
   |     -STREAMS_001
   |     |       -CHUNK_0001. MPEG2
   |     |
   |     -STREAMS_002
   |     |       -CHUNK_0011. MPEG2
   |     |       -CHUNK_0012. MPEG2
   |     |       -CHUNK_0031. MPEG2*
   |     |
```

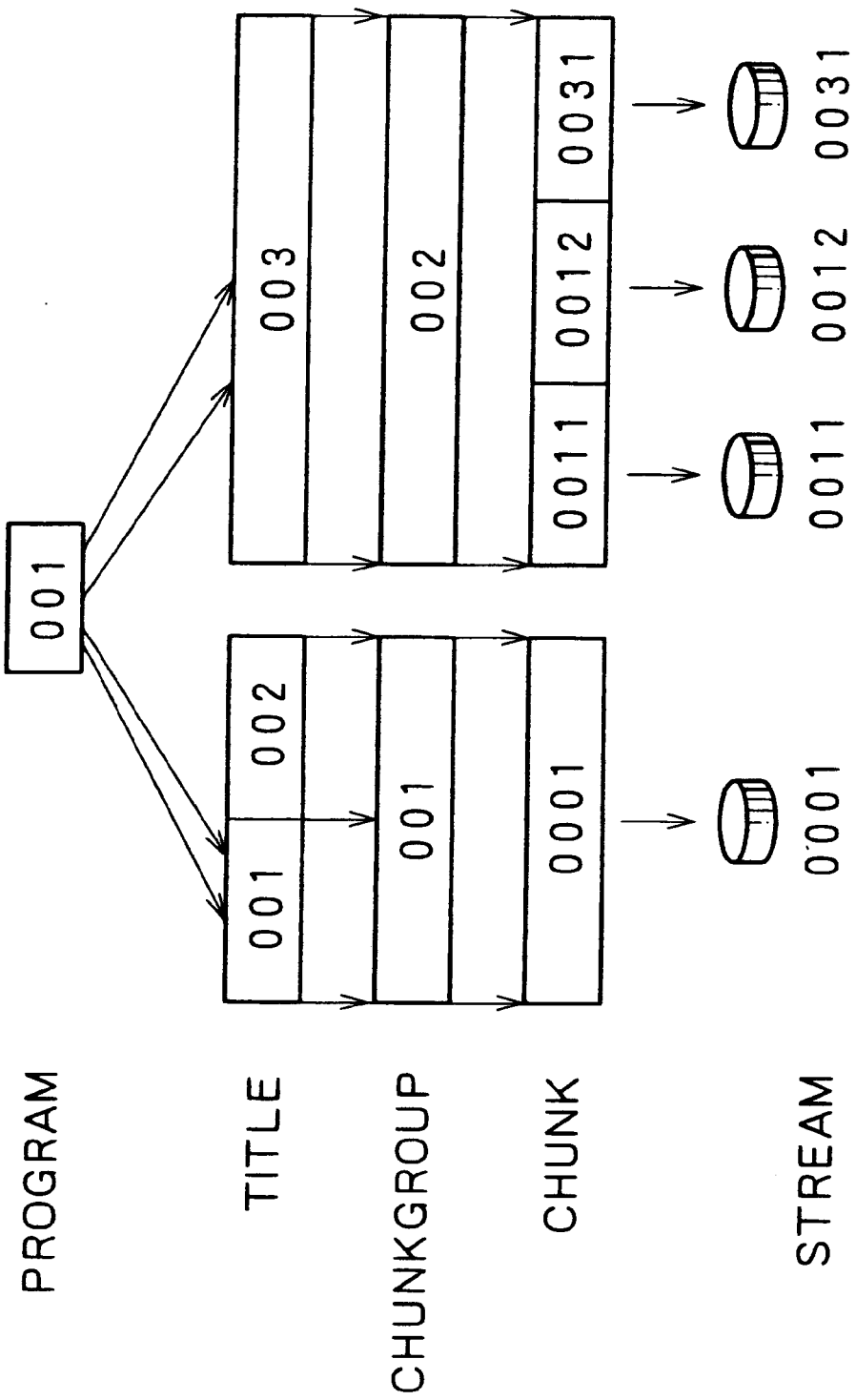

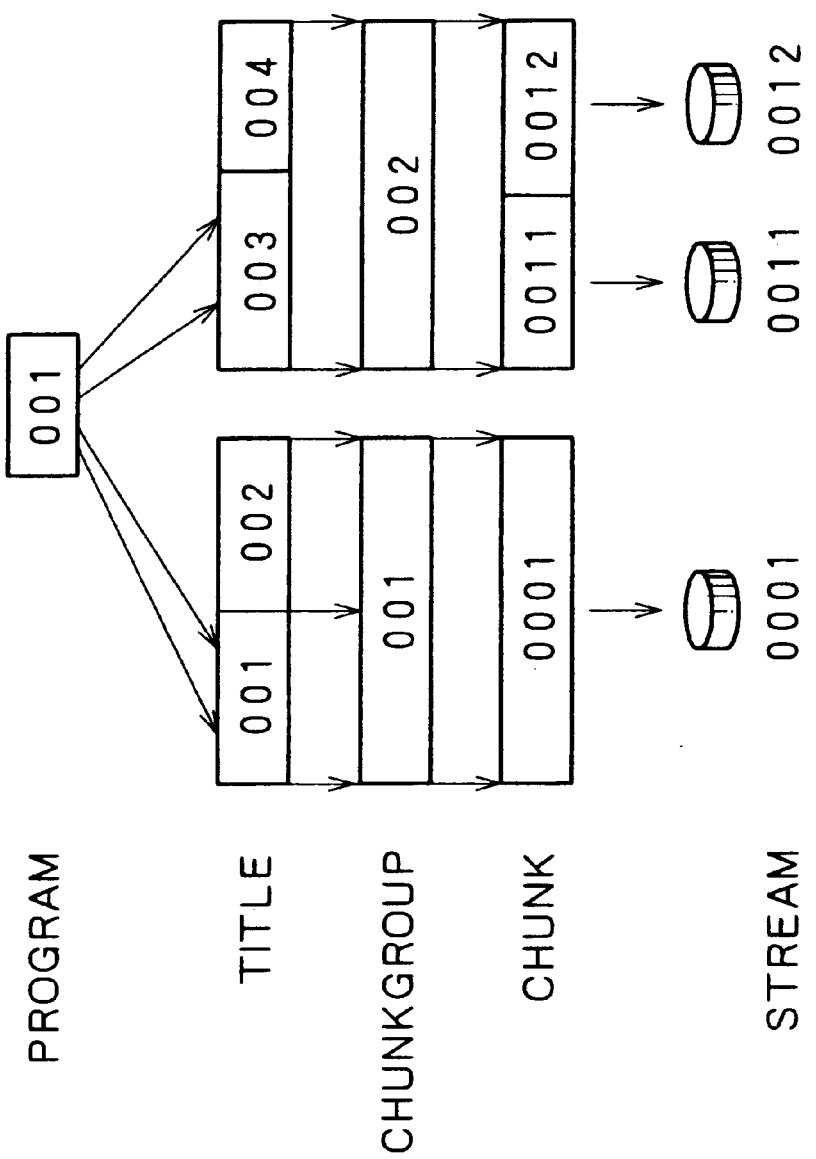

FIG. 36

| volume_write_protect_level | Meaning |
|---|---|
| 0 | write protect is disabled |
| 1 | ONLY volume_write_protect_level CAN BE CHANGED |
| 2 | "ALBUM.STR" CAN BE CHANGED |
| 3 | "VOLUME.TOC" CAN BE CHANGED |
| 4 | ALL PROGRAMS (*.PGI) CAN BE CHANGED |
| 5 | ALL TITLES (.VDR) CAN BE CHANGED |
| 6 | *.MPEG2, *.ABST AND *.CGIT CAN BE CHANGED |
| 7-15 | reserved |

FIG. 37

| append_only_flag | Meaning |
|---|---|
| 0b | IN ACCORDANCE WITH THE PRESCRIPTION OF volume_write_protect_level |
| 1b | ONLY APPEND RECORDING IN A RANGE PRESCRIBED BY volume_write_protect_level IS ALLOWED |

RECORDING/PLAYBACK APPARATUS, RECORDING/PLAYBACK METHOD, PRESENTATION MEDIUM AND RECORDING MEDIUM

BACKGROUND OF THE INVENTION

In general, the present invention relates to a recording/playback apparatus, a recording/playback method, a presentation medium and a recording medium. More particularly, the present invention relates to a recording/playback apparatus, a recording/playback method, a presentation medium and a recording medium that are capable of recording data by distinguishing overwrite recording from append recording.

Data already recorded on a recording medium such as an optical disc or a magnetic disc can be erased to allow new data to be recorded on the same area as the erased data. That is to say, an overwrite recording can be carried out. In this way, unnecessary data can be erased and only necessary data can be recorded, allowing the recording area of the recording medium to be utilized efficiently.

In addition, in order to prevent recorded data from being erased by mistake, normally, each of these discs has a notch provided typically on the case thereof and used for selecting whether to disable or enable an operation to record new data onto the disc. To be more specific, by switching the notch to a recording-operation disabling position, an operation to newly record other data over data already recorded on the disc can be inhibited.

As described above, an operation to newly record other data over data already recorded on the disc can be inhibited by switching the notch to the recording-operation disabling position. Once the notch is switched to the recording-operation disabling position, however, data can no longer be recorded onto the disc even if an unrecorded area still remains on the disc, raising a problem of an inability to use the recording area of the disc efficiently.

SUMMARY OF THE INVENTION

It is an object of the present invention addressing the problem described above to prevent a recording operation from being carried out by mistake and to use the recording area of the disc efficiently.

A recording apparatus according to claim 1 is characterized in that the apparatus comprises:

an append-recording specifying means for specifying whether or not a recording operation to append data to a recording medium is allowed;

a specification judging means for forming a judgment on a specification indicated by the append-recording specifying means; and a control means for controlling an operation to record data onto the recording medium in accordance with a result of a judgment formed by the specification judging means.

A recording method to claim 4 is characterized in that the method comprises:

an append recording specifying step of specifying whether or not a recording operation to append data to a recording medium is allowed;

a specification judging step of forming a judgment on a specification indicated at the append recording specifying step;

a control step of controlling an operation to record data onto the recording medium in accordance with a result of a judgment formed at the specification judging step.

A presentation medium according to claim 5 is characterized in that the medium is used for presenting a program to be executed by a recording apparatus for carrying out processing including:

an append recording specifying step of specifying whether or not a recording operation to append data to a recording medium is allowed;

a specification judging step of forming a judgment on a specification indicated at the append recording specifying step; and a control step of controlling an operation to record data onto the recording medium in accordance with a result of a judgment formed at the specification judging step.

A recording medium according to claim 6 is characterized that the medium includes recorded append-recording information indicating whether or not a recording operation to append data to the medium is allowed.

In the recording apparatus according to claim 1, the recording method according to claim 4 and the presentation medium according to claim 5, a judgment as to whether or not an append-recording operation is allowed is formed and an operation to record data onto a recording medium is controlled in accordance with a result of the judgment.

On the recording medium according to claim 6, information on append recording indicating whether or not an append-recording operation is allowed is recorded.

BRIEF DESCRIPTION OF THE DRAWINGS

FIG. 2 is an explanatory diagram showing VOLUME.TOC;

FIG. 3 is an explanatory diagram showing volume$_{13}$ information ( );

FIG. 4 is an explanatory diagram showing volume_attribute ( );

FIG. 5 is an explanatory diagram showing resume ( );

FIG. 6 is an explanatory diagram showing volume_rating ( );

FIG. 7 is an explanatory diagram showing write_protect ( );

FIG. 8 is an explanatory diagram showing play_protect ( );

FIG. 9 is an explanatory diagram showing recording_timer ( );

FIG. 10 is an explanatory diagram showing text_block ( );

FIG. 11 is an explanatory diagram showing language_set ( );

FIG. 12 is an explanatory diagram showing text_item ( );

FIG. 13 is an explanatory diagram showing ALBUM.STR;

FIG. 14 is an explanatory diagram showing album ( );

FIG. 15 is an explanatory diagram showing TITLE_###.VDR;

FIG. 16 is an explanatory diagram showing title_info ( );

FIG. 17 is an explanatory diagram showing PROGRAM_$$$.PGI;

FIG. 18 is an explanatory diagram showing program ( );

FIG. 19 is an explanatory diagram showing play_list ( );

FIG. 20 is an explanatory diagram showing play_item ( );

FIG. 21 is an explanatory diagram showing CHUNKGROUP_@@@.CGIT;

FIG. 22 is an explanatory diagram showing chunk_connection_info ( );

FIG. 23 is an explanatory diagram showing chunk_arrangement_info ( );

FIG. 24 is an explanatory diagram showing CHUNK_%%%%.ABST;

FIG. 26 is an explanatory diagram showing an organization of directories;

FIG. 29 is an explanatory diagram showing an organization of directories;

FIG. 30 is an explanatory diagram showing an organization of directories;

FIG. 32 is an explanatory diagram showing an organization of directories;

FIG. 33 is an explanatory diagram showing an organization of directories;

FIG. 34 is an explanatory diagram showing a logical organization of directories;

FIG. 35 is an explanatory diagram showing a logical organization of directories;

FIG. 36 is an explanatory diagram showing volume_write_protect_level;

FIG. 37 is an explanatory diagram showing append_only_flag;

DETAILED DESCRIPTION OF THE PREFERRED EMBODIMENTS

In order to clarify relations between means described in claims of the specification and embodiments of the present invention before explaining the embodiments themselves, characteristics of the present invention are described by appending a typical implementation for each of the means enclosed in parentheses to the means as follows. It is needless to say, however, that the appending of a typical implementation to a means in the following description does not necessarily imply that implementations of the means are limited to the typical implementation.

Figure 39:
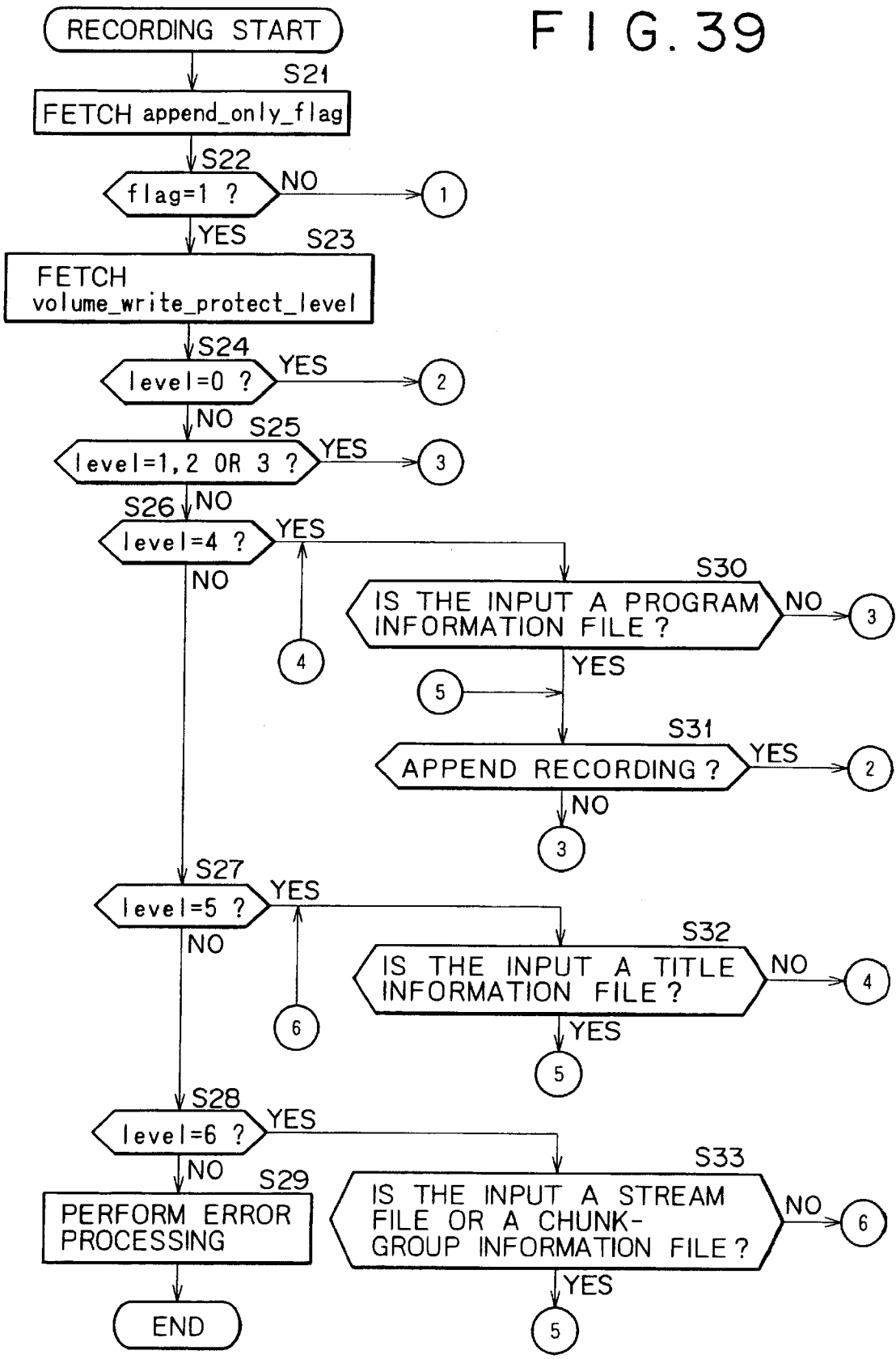
FIG. 39 shows a flowchart representing recording processing.
Figure 40:
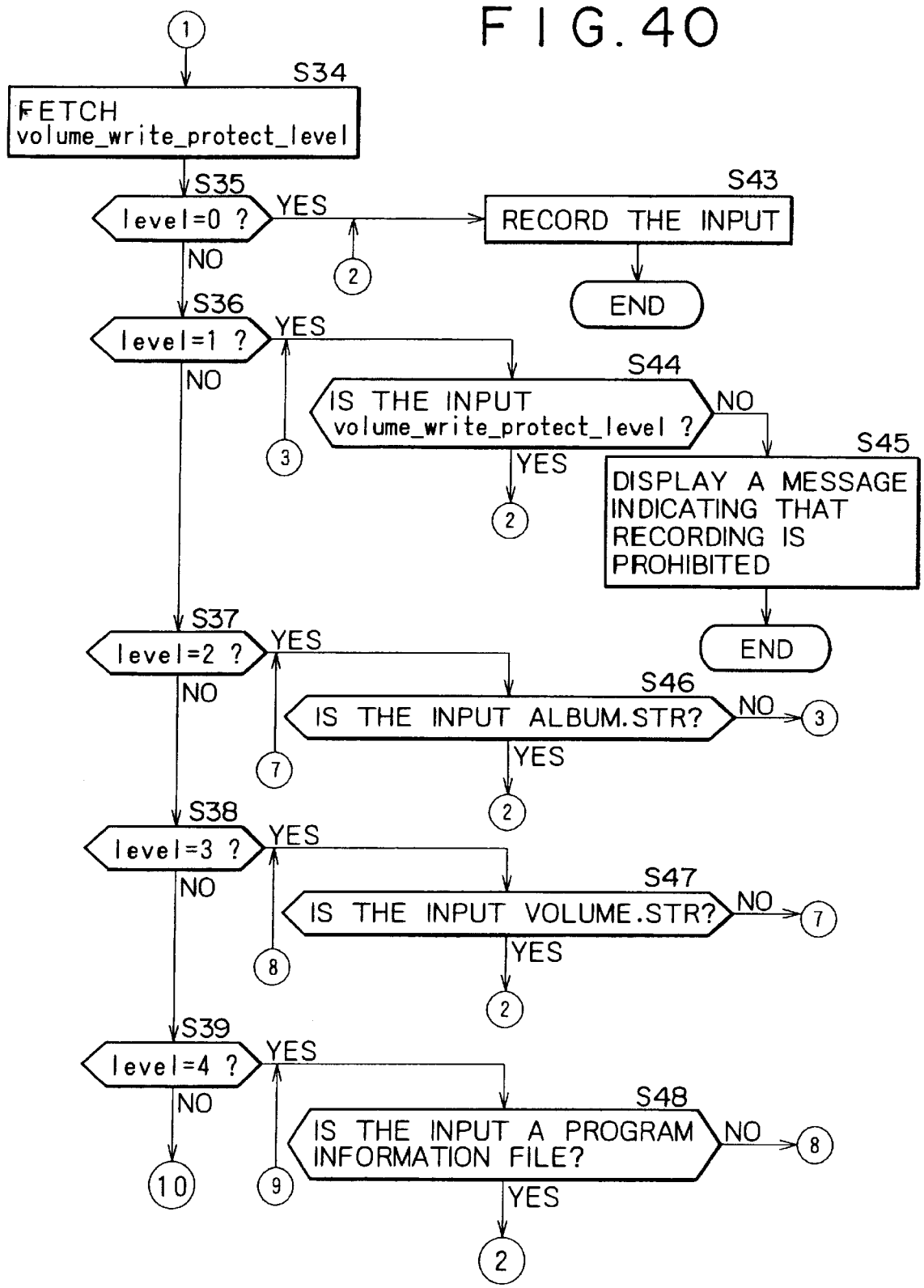
FIG. 40 shows a flowchart representing recording processing.

A recording apparatus according to claim 1 is characterized in that the apparatus comprises:

an append-recording specifying means (implemented by typically append_only_flag shown in FIG. 7) for specifying whether or not a recording operation to append data to a recording medium is allowed;

a specification judging means (implemented by typically a step S22 of a flowchart shown in FIG. 39) for forming a judgment on a specification indicated by the append-recording specifying means; and a control means (implemented by typically steps S24 to S28 of the flowchart shown in FIG. 39, and S43 and S45 of the flowchart shown in FIG. 40) for controlling an operation to record data onto the recording medium in accordance with a result of a judgment formed by the specification judging means.

According to claim 2, there is provided a recording apparatus as in claim 1 characterized in that the apparatus further has a recording prohibition/permission specifying means (implemented by typically volume_write_protect_level shown in FIG. 7) for specifying whether an operation to record data onto a recording medium is prohibited or permitted for each data type and the append-recording specifying means specifies whether an append-recording operation is prohibited or permitted within a range specified by the recording prohibition/permission specifying means.

Figure 1:
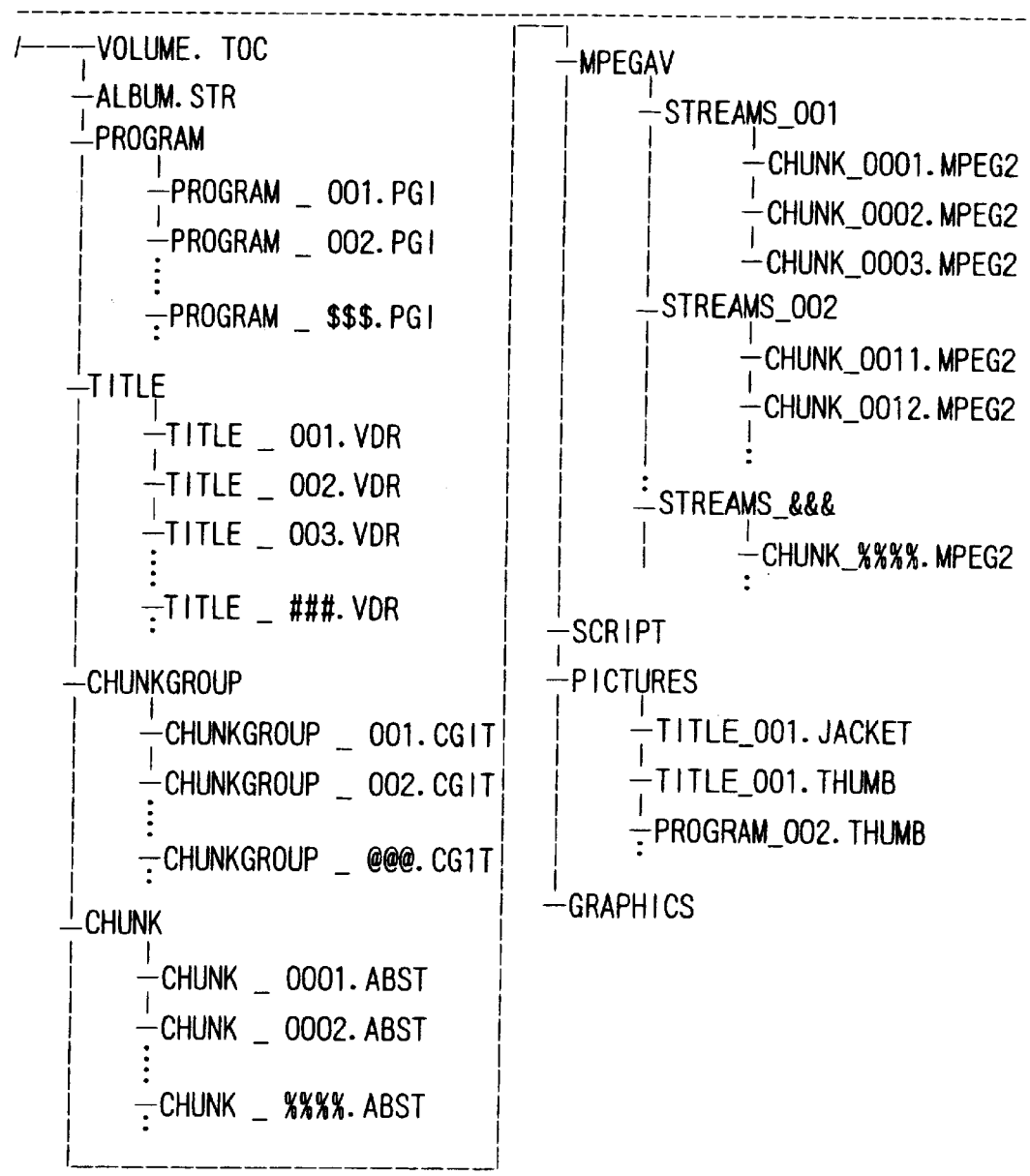
FIG. 1 is a diagram showing an organization of directories.

The description begins with an explanation of an arrangement of files on a recording medium (media) of the present invention which information is recorded onto and read out from. As shown in FIG. 1, the following 7 types of file are recorded on the recording medium.

VOLUME.TOC
ALBUM.STR
PROGRAM_$$$.PGI
TITLE_###.VDR
CHUNKGROUP_@@@.CGIT
CHUNK_%%%%.ABST
CHUNK_%%%%.MPEG2

VOLUME.TOC and ALBUM.STR are placed in the root directory.

PROGRAM_$$$.PGI where $$$ represents a program number is placed in a directory named PROGRAM right below the root directory.

Similarly, TITLE_###.VDR where ### represents a title number is placed in a directory named TITLE right below the root directory. Furthermore, CHUNKGROUP_@@@.CGIT where @@@ represents a chunk-group number is placed in a directory named CHUNKGROUP right below the root directory. Likewise, CHUNK_%%%%.ABST where %%%% represents a chunk number is placed in a directory named CHUNK right below the root directory.

One or more sub-directories are created under a directory named MPEGAV right below the root directory. CHUNK_%%%%.MPEG2 where %%%% represents a chunk number are placed in the sub-directories.

Normally, only one VOLUME.TOC file exists in the recording medium. In a recording medium having a special structure such as a hybrid structure like a ROM or a RAM, however, a plurality of VOLUME.TOC files may exist. This file is used for showing properties of the recording medium as a whole.

The structure of VOLUME.TOC is shown in FIG. 2. As shown in the figure, at the head of the structure, file_type_id is placed to indicate that the file is VOLUME.TOC. file_type_id is followed by volume_information ( ) which is followed by text_block ( ) at the end of the structure.

The structure of volume_information ( ) is shown in FIG. 3. As shown in the figure, volume_information ( ) comprises volume_attribute ( ), resume ( ), volume_rating ( ), write_protect ( ), play_protect ( ) and recording_timer ( ).

volume_attribute ( ) shown in FIG. 3 is an area used for recording attributes of the logical volume. A detailed structure of volume_attribute ( ) is shown in FIG. 4. As shown in the figure, volume_attribute ( ) includes title_playback mode_flag and program_playback mode_flag.

resume ( ) shown in FIG. 3 is an area used for recording information which is used for restoring a state just before the recording medium was ejected when the recording medium is reinserted. The detailed structure of resume ( ) is shown in FIG. 5.

volume rating ( ) shown in FIG. 3 is an area used for recording information for implementing watching/listening age restrictions for the entire volume by watcher/listener age and watcher/listener category. The detailed structure of volume rating ( ) is shown in FIG. 6.

write_protect ( ) shown in FIG. 3 is an area used for recording information for restricting operations to change and delete titles and programs recorded in the volume. The detailed structure of write_protect ( ) is shown in FIG. 7.

play_protect ( ) shown in FIG. 3 is an area used for recording information for indicating whether or not titles and programs recorded in the volume can be played back or information used for limiting the number of playback operations. The detailed structure of play_protect ( ) is shown in FIG. 8.

recording_timer ( ) shown in FIG. 3 is an area used for recording information for controlling a recording time. The detailed structure of recording_timer ( ) is shown in FIG. 9.

The detailed structure of text_block ( ) of VOLUME.TOC shown in FIG. 2 is shown in FIG. 10. As shown in FIG. 10, text_block ( ) includes language_set ( ) and text_item ( ), the detailed structures of which are shown in FIGS. 11 and 12 respectively.

Normally, only one ALBUM.STR file shown in FIG. 1 exists in the recording medium. In a recording medium having a special structure such as a hybrid structure like a ROM or a RAM, however, a plurality of ALBUM.STR files may exist. This file is used for combining a plurality of recording media into a structure that appears as a structure of a single recording medium.

The structure of ALBUM.STR is shown in FIG. 13. As shown in the figure, at the head of the structure, file_type_id is placed to indicate that the file is ALBUM.STR. file_type_id is followed by album ( ) which is followed by text_block ( ) at the end of the structure.

album ( ) is an area used for recording information for handling a plurality of volumes or recording media as one. The detailed structure of album ( ) is shown in FIG. 14.

As many TITLE_###.VDR files shown in FIG. 1 as titles exist in the recording medium. A title is a piece of music in the case of a compact disc or a program in the case of television broadcasting. The structure of TITLE_###.VDR is shown in FIG. 15. As shown in the figure, at the head of the structure, file_type_id is placed to indicate that the file is TITLE_###.VDR. file_type_id is followed by title_info ( ) which is followed by text_block ( ) at the end of the structure. Notation ### is a string of characters representing a title number.

title_info ( ) is an area used for recording a start point, an end point and attributes of a title on a chunk group. The detailed structure of title_info ( ) is shown in FIG. 16.

As many PROGRAM_$$$.PGI files shown in FIG. 1 as programs exist in the recording medium. A program comprises a plurality of cuts each specifying the area of a portion of a title or the area of an entire title. Cuts are played back in a specified order. The structure of PROGRAM_$$$.PGI is shown in FIG. 17. As shown in the figure, at the head of the structure, file_type_id is placed to indicate that the file is PROGRAM_$$$.PGI. file_type_id is followed by program ( ) which is followed by text_block ( ) at the end of the structure. Notation $$$ is a string of characters representing a program number.

program ( ) is an area used for recording information necessary for a playback operation obtained by collecting necessary portions of titles without the need to carry out irreversible processing on materials. The detailed structure of program ( ) is shown in FIG. 18.

program ( ) shown in FIG. 18 has one play_list ( ). Details of play_list ( ) are shown in FIG. 19.

As shown in FIG. 19, play_list ( ) includes a plurality of play_item ( ). Details of play_item ( ) are shown in FIG. 20.

As many CHUNKGROUP_@@@.CGIT files shown in FIG. 1 as chunk groups exist in the recording medium. A chunk group is a data structure for arranging a bitstream. The user is not aware of the existence of this file as long as the user normally operates an apparatus for recording and playing back information onto and from a recording medium such as a VDR (Video-Disc Recorder).

The structure of the CHUNKGROUP_@@@.CGIT file is shown in FIG. 21. As shown in the figure, at the head of the structure, file_type_id is placed to indicate that the file is CHUNKGROUP_@@@.CGIT. file_type_id is followed by chunkgroup_time_base_flags, chunkgroup_time_base_offset and chunk_connection_info ( ) which is followed by text_block ( ) at the end of the structure.

chunkgroup_time_base_flags is flags related to a reference counter of the chunk group and chunkgroup_time base_offset indicates a start time of a reference time axis in the chunk group. chunkgroup_time_base_flags has a 32-bit value to be set in a counter which counts up at a frequency of 90 kHz.

chunk_connection_info ( ) is an area used for recording information on special points such as a video switching points or video and audio synchronization. The detailed structure of chunk_connection_info ( ) is shown in FIG. 22.

chunk_connection_info ( ) includes as many loops of chunk_arrangement_info ( ) as chunks pertaining to the chunk group. Details of chunk_arrangement_info ( ) are shown in FIG. 23.

As many CHUNK_%%%%.ABST files shown in FIG. 1 as chunks exist in the recording medium. A chunk is an information file corresponding to a stream file. The structure of the CHUNK_%%%%.ABST file is shown in FIG. 24. As shown in the figure, at the head of the structure, file_type_id is placed to indicate that the file is CHUNK_%%%%.ABST.

The CHUNK_%%%%.MPEG2 file shown in FIG. 1 is a stream file. The CHUNK_%%%%.MPEG2 file is different from other files in that the CHUNK_%%%%.MPEG2 file is used for storing an MPEG bitstream while the other files are used for storing information only.

Figure 25:
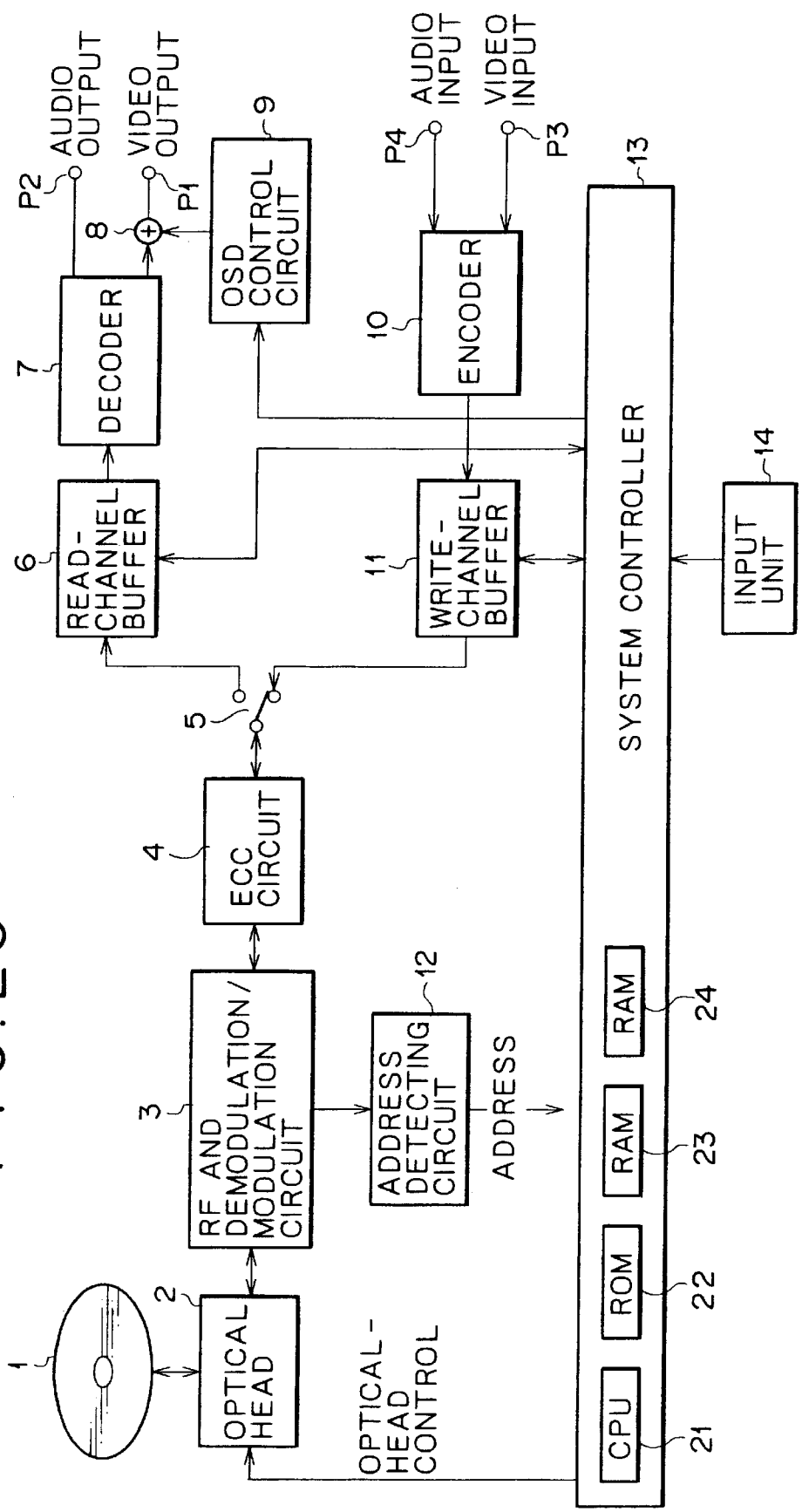
FIG. 25 is a block diagram showing a typical configuration of an optical-disc apparatus to which the present invention is applied.

FIG. 25 is a diagram showing a typical configuration of an optical-disc apparatus for recording and playing back information onto and from an optical disc serving as a recording medium containing the files described above. In the optical-disc apparatus, a single optical head 2 is provided for a rewritable optical disc 1. The optical head 2 is used for both recording and playing back information onto and from the optical disc 1.

A bitstream read out by the optical head 2 from the optical disc 1 is demodulated by a demodulation/modulation circuit 3 before being subjected to error correction by an ECC circuit 4. The bitstream is then supplied to a read-channel buffer 6 for absorbing a difference between a read rate and a decoding-process rate by way of a switch 5. A bitstream output by the read-channel buffer 6 is supplied to a decoder 7. The read-channel buffer 6 is designed into a configuration that can be read by a system controller 13.

The bitstream output by the read-channel buffer 6 is decoded by the decoder 7 to generate video and audio signals. The video signal generated by the decoder 7 is supplied to a synthesis circuit 8 to be synthesized with a video signal output by an OSD (On Screen Display) control circuit 9 before being fed to a display unit not shown in the figure to be displayed thereon by way of an output terminal P1. On the other hand, the audio signal generated by the decoder 7 is transmitted to a speaker also not shown in the figure by way of an output terminal P2.

In the mean time, a video signal input through an input terminal P3 and an audio signal input through an input terminal P4 are encoded by an encoder 10 before being supplied to a write-channel buffer 11 for absorbing a difference between an encoding-process rate and a write rate. Like the read-channel buffer 6, the write-channel buffer 11 is designed into a configuration that can be read by the system controller 13.

Data stored in the write-channel buffer 11 is read out from the write-channel buffer 11 and supplied to the ECC circuit 4 by way of the switch 5 to undergo error correction before being modulated by the RF and demodulation/modulation circuit 3. An RF signal output by the RF and demodulation/modulation circuit 3 as a result of the modulation is written into the optical disc 1 by the optical head 2.

An address detecting circuit 12 detects address information of a track on the optical disc 1 subjected to the recording or playback operation. A system controller 13 controls operations of components constituting the optical-disc apparatus. The system controller 13 comprises a CPU 21 for executing various kinds of control, a ROM unit 22 for storing information such as a processing program to be executed by the CPU 21, a RAM unit 23 for temporarily storing information such as data resulting from a processing process and a RAM unit 24 for storing a variety of information files to be recorded or played back from or the optical disc 1. The CPU 21 finely adjusts the position of the optical head 2 on the basis of a result detected by the address detecting circuit 12. In addition, the CPU 21 also controls an operation to change over the switch 5. An input unit 14 comprising a variety of switches and buttons is operated by the user for entering a variety of commands.

Next, a basic operation to read out an information file is explained. For example, in order to read out the VOLUME.TOC information file, first of all, the CPU 21 employed in the system controller 13 uses a file-system operation instruction included in a processing program in advance to confirm the physical address of VOLUME.TOC on the optical disc 1 and the length thereof. Then, the CPU 21 moves the optical head 2 to a read position based on the address information of VOLUME.TOC. Subsequently, the CPU 21 puts the optical head 2, the RF and demodulation/modulation circuit 3 and the ECC circuit 4 in a read mode and, at the same time, changes over the switch 5 to a position connected to the read-channel buffer 6. Furthermore, after finely adjusting the position of the optical head 2, the CPU 21 starts a read operation by using the optical head 2. In this way, contents of VOLUME.TOC are read out by the optical head 2 and demodulated by the RF and demodulation/modulation circuit 3. A signal output by RF and demodulation/modulation circuit as a result of the demodulation is further subjected to error correction by the ECC circuit 4 before being stored in the read-channel buffer 6 by way of the switch 5.

At a point the amount of data stored in the read-channel buffer 6 becomes equal to the size of VOLUME.TOC or exceeds it, the CPU 21 halts the read operation. Then, the CPU 21 reads out the data from the read-channel buffer 6 and stores the data into the RAM unit 24.

Next, a basic operation to write data into an information file is exemplified by an operation to write data into the VOLUME.TOC information file. First of all, the CPU 21 uses a file-system operation instruction included in a processing program in advance to search a file system (that is, the optical disc 1) for a free area with a size equal to or larger than VOLUME.TOC into which data of VOLUME.TOC is to be written and confirm the address of the area.

Then, the CPU 21 transfers new VOLUME.TOC stored in the RAM unit 24 to be written into the optical disc 1 to the write-channel buffer 11. Subsequently, the CPU 21 moves the optical head 2 to a write position based on address information of a free area on the optical disc 1. The CPU 21 then puts the optical head 2, the RF and demodulation/modulation circuit 3 and the ECC circuit 4 in a write mode and, at the same time, changes over the switch 5 to a position connected to the write-channel buffer 6. Furthermore, after finely adjusting the position of the optical head 2, the CPU 21 starts a write operation by using the optical head 2.

In this way, contents of newly provided VOLUME.TOC are read out from the write-channel buffer 11 and supplied to the ECC circuit 4 by way of the switch 5. In the ECC circuit 4, error correction codes are added to the contents which are then supplied to the RF and demodulation/modulation circuit 3 to be modulated. A signal output by the RF and demodulation/modulation circuit 3 as a result of the modulation is recorded onto the optical disc 1 by using the optical head 2. At a point the amount of data read out from the write-channel buffer 11 and recorded onto the optical disc 1 becomes equal to the size of VOLUME.TOC, the CPU 21 halts the write operation.

Finally, the CPU 21 uses a file-system operation instruction included in the processing program in advance to update a pointer pointing to VOLUME.TOC in the file system (that is, on the optical disc 1) to point to a position at which VOLUME.TOC was newly stored.

Next, a basic stream playback operation is exemplified by an operation to play back a stream named CHUNK_0001.MPEG2 shown in FIG. 1. First of all, the CPU 21 uses a file-system operation instruction included in a processing program in advance to confirm the physical address of CHUNK_0001.MPEG2 on the optical disc 1 and the length thereof. Then, the CPU 21 moves the optical head 2 to a read position based on the address information of CHUNK_0001.MPEG2. Subsequently, the CPU 21 puts the optical head 2, the RF and demodulation/modulation circuit 3 and the ECC circuit 4 in a read mode and, at the same time, changes over the switch 5 to a position connected to the read-channel buffer 6. Furthermore, after finely adjusting the position of the optical head 2, the CPU 21 starts a read operation by using the optical head 2.

In this way, contents of CHUNK_0001.MPEG2 are read out by the optical head 2 and demodulated by the RF and demodulation/modulation circuit 3. A signal output by RF and demodulation/modulation circuit 3 as a result of the demodulation is further subjected to error correction by the ECC circuit 4 before being stored in the read-channel buffer 6 by way of the switch 5. The data stored in the read-channel buffer 6 is supplied to the decoder 7 to undergo a decoding process for generating video and audio signals. The audio signal generated by the decoder 7 is transmitted to a speaker by way of the output terminal P2. On the other hand, the video signal generated by the decoder 7 is supplied to a synthesis circuit 8 to be synthesized before being fed to a display unit to be displayed thereon by way of the output terminal P1.

At a point the amount of data read out from the optical disc 1, decoded by the decoder 7 and displayed on the display unit becomes equal to the size of CHUNK_0001.MPEG2 or a command to halt the read operation is entered via the input unit 14, the CPU 21 halts the read and decode operations.

Next, a basic operation to record a stream is exemplified by an operation to write data into the CHUNK_0001.MPEG2 information file. First of all, the CPU 21 uses a file-system operation instruction included in a processing program in advance to search a file system (that is, the optical disc 1) for a free area with a size equal to or larger than CHUNK_0001.MPEG2 into which a stream of CHUNK_0001.MPEG2 is to be written and confirm the address of the area.

Then, a video signal input from the input terminal P3 and an audio signal input from the input terminal P4 are encoded by the encoder 10 before being written into the write-channel buffer 11. Subsequently, the CPU 21 moves the optical head 2 to a write position based on address information of a free area on the optical disc 1. The CPU 21 then puts the optical head 2, the RF and demodulation/modulation circuit 3 and the ECC circuit 4 in a write mode and, at the same time, changes over the switch 5 to a position connected to the write-channel buffer 11. Furthermore, after finely adjusting the position of the optical head 2, the CPU 21 starts a write operation by using the optical head 2. In this way, contents of newly provided CHUNK_0001.MPEG2 are read out from the write-channel buffer 11 and supplied to the ECC circuit 4 by way of the switch 5. In the ECC circuit 4, error correction codes are added to the contents which are then supplied to the RF and demodulation/modulation circuit 3 to be modulated. A signal output by the RF and demodulation/modulation circuit 3 as a result of the modulation is recorded onto the optical disc 1 by using the optical head 2.

At a point the amount of data read out from the write-channel buffer 11 and recorded onto the optical disc 1 becomes equal to a value determined in advance or when a command to halt the write operation is entered via the input unit 14, the CPU 21 halts the write operation. Finally, the CPU 21 uses a file-system operation instruction included in the processing program in advance to update a pointer pointing to CHUNK_0001.MPEG2 in the file system (that is, on the optical disc 1) to point to a position at which CHUNK_0001.MPEG2 was newly stored.

Assume that information files and stream files like ones shown in FIG. 26 are recorded on the optical disc 1 at the present time. In this example, the optical disc 1 includes a program file named PROGRAM_001.PGI and 3 title files, namely, TITLE_001.VDR, TITLE_002.VDR and TITLE_003.VDR.

In addition, the optical disc 1 also includes 2 chunk-group information files named CHUNKGROUP_001.CGIT and CHUNKGROUP_002.CGIT. The optical disc 1 also includes 3 stream files, namely, CHUNK_0001.MPEG2, CHUNK_0011.MPEG2 and CHUNK_0012.MPEG2 and 3 information files named CHUNK_0001.ABST, CHUNK_0011.ABST and CHUNK_0012.ABST for storing information for CHUNK_0001.MPEG2, CHUNK_0011.MPEG2 and CHUNK_0012.MPEG2 respectively.

Figure 27:
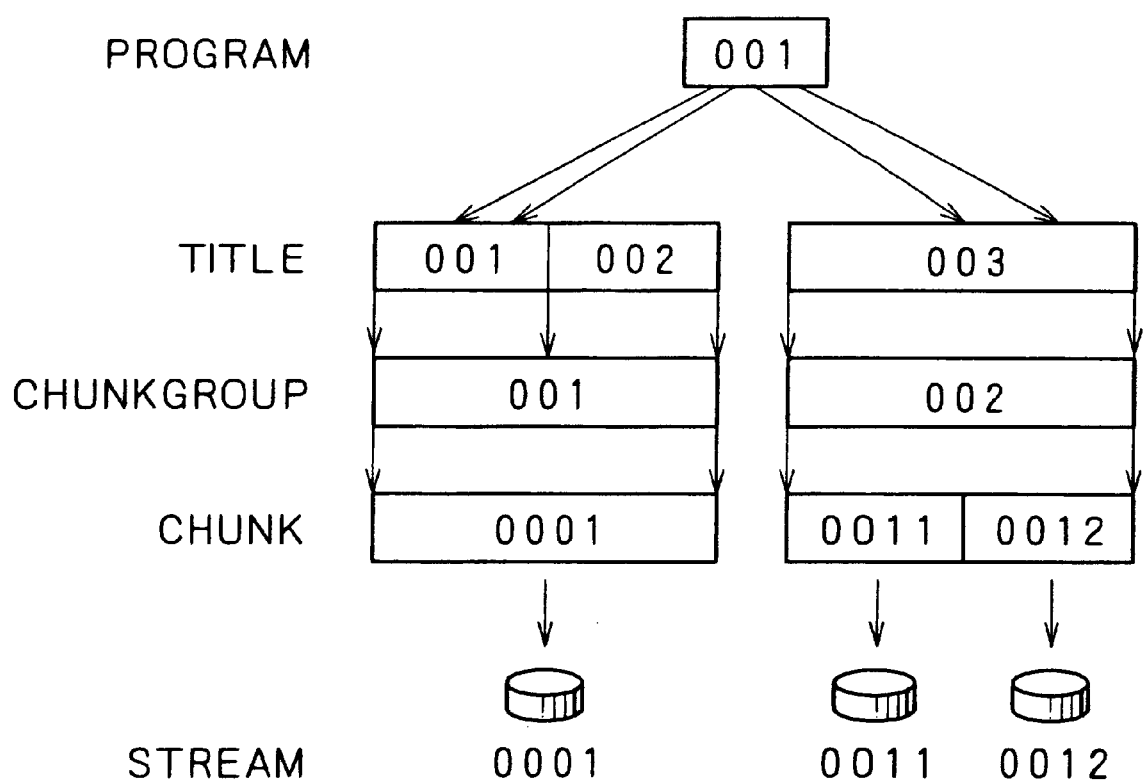
FIG. 27 is an explanatory diagram showing a logical organization of directories.

The logical structure of the optical disc 1 including the information and stream files shown in FIG. 26 is shown in FIG. 27. In this example, the chunk information files named CHUNK_0001.ABST, CHUNK_0011.ABST and CHUNK_0012.ABST specify the CHUNK_0001.MPEG2, CHUNK_0011.MPEG2 and CHUNK_0012.MPEG2 stream files respectively. To put it concretely, in a chunk_file_id field of the CHUNK_%%%%.ABST file shown in FIG. 24, a file ID of the respective stream is specified.

In addition, in this example, the chunk-group information file named CHUNKGROUP_001.CGIT specifies the CHUNK_0001.ABST chunk information file whereas the chunk-group information file named CHUNKGROUP_002.CGIT specifies the CHUNK_0011.ABST and CHUNK_0012.ABST chunk information files. To put it concretely, in a chunk_info_file_id field of chunk_arrangement_info shown in FIG. 23, a file ID of chunk information is specified. chunk_arrangement_info ( ) is included in a chunk-group information file. There are as many pieces of chunk_arrangement_info ( ) as chunks pertaining to the chunk group forming a data structure in the chunk-group information file. To put it in detail, pieces of chunk_arrangement_info each shown in FIG. 23 are described in chunk_connection_info ( ) of FIG. 22 which is described in CHUNKGROUP_@@@.CGIT shown in FIG. 21.

CHUNKGROUP_001 includes only one chunk_arrangement_info ( ), the chunk_info_file_id field of which specifies CHUNK_0001. On the other hand, CHUNKGROUP_002 includes only 2 pieces of chunk_arrangement_info ( ), the chunk_arrangement_info ( ) fields of which specify CHUNK_0011 and CHUNK_0012 respectively. With such a scheme, a chunk group is capable of specifying information such as a playback order of a plurality chunks.

To put it concretely, first of all, chunkgroup_time_base_offset in CHUNKGROUP_@@@.CGIT shown in FIG. 21 is used for determining an initial value of a clock in the chunk group. Then, when chunks are cataloged, presentation_start_cg_time_count and presentation_end_cg_time_count of chunk_arrangement_info ( ) shown in FIG. 23 are specified.

Figure 28:
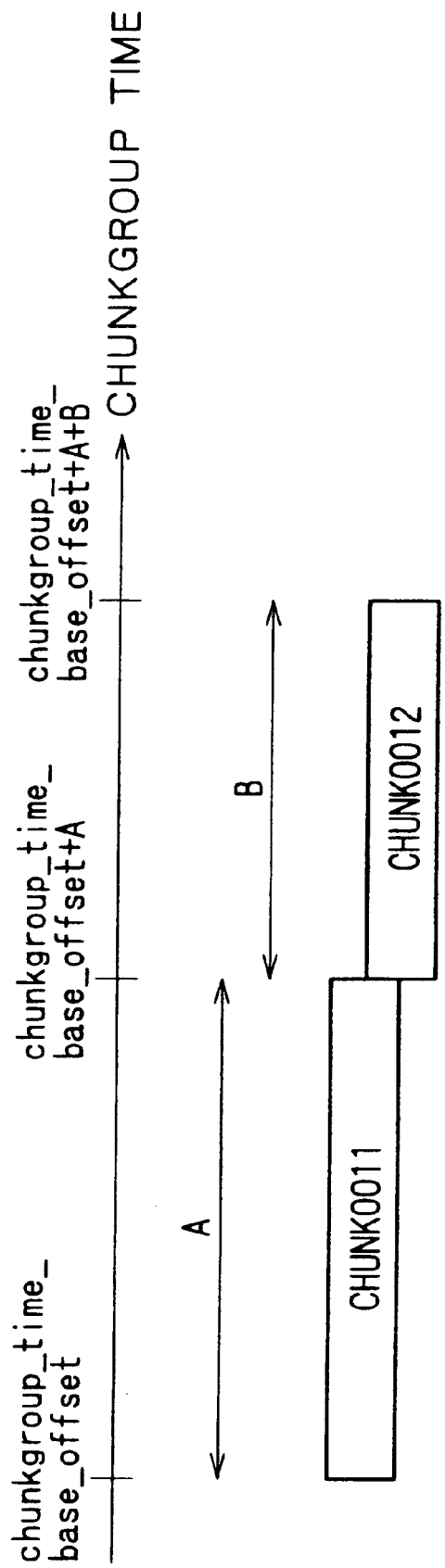
FIG. 28 is an explanatory diagram showing an offset.

Assume, for example, that the length (time) of CHUNK_0011 is A whereas the length (time) of CHUNK_0012 is B as shown in FIG. 28. In this case, presentation_start_cg_time_count of CHUNK_0011 is equal to chunkgroup_time_base_offset and presentation_end_cg_time_count thereof is equal to (chunkgroup_time_base_offset+A). On the other hand, presentation_start_cg_time_count of CHUNK_0012 is equal to (chunkgroup_time_base_offset+A) and presentation_end_cg_time_count thereof is equal to (chunkgroup_time_base_offset+A+B). By setting pieces of information in this way, CHUNKGROUP_002 is defined so that CHUNK_0012 is played back right after CHUNK_0011.

It should be noted that, if CHUNK_0011 and CHUNK_0012 are to be played back with their playback times partially overlapping each other, presentation_end_cg_time_count of CHUNK_0012 can be set at a value smaller than presentation_start_cg_time_count of CHUNK_0011. In addition, by describing transition_( ) in chunk_arrangement_info ( ) shown in FIG. 23, special effects such as fade-in, fade-out and wipe can be specified in a transition between the 2 streams.

In the example shown in FIG. 26 (or FIG. 27), the title information files named TITLE_001.VDR and TITLE_002.VDR specify the CHUNKGROUP_001.CGIT chunk-group information file whereas the title information file named TITLE_003.VDR specifies the CHUNKGROUP_002.CGIT chunk-group information file. To put it concretely, in a cgit_file_id field of title_info ( ) shown in FIG. 16, the file ID of a chunk group is specified and, in title_start_chunk_group_time_stamp and title_end_chunk_group_time_stamp fields, a time range for defining a title in the chunk group is specified.

For example, in the example shown in FIG. 27, TITLE_001 and TITLE_002 point to the first and second halves of CHUNKGROUP_001 respectively. It should be noted that CHUNKGROUP_001 is split in this way at a request made by the user. The point of split is arbitrary for the user and can not be determined in advance. In this example, the spilt point is set at a position separated away from the head of CHUNKGROUP_001 by a distance of A.

TITLE_001 specifies CHUNKGROUP_001 as a chunk group, the start time of CHUNKGROUP_001 as a start time of the title and a point of time specified by the user as an end time of the title.

That is to say, chunkgroup_time_base_offset (the start position) of CHUNKGROUP_001 is set as title_start chunk_group time stamp of TITLE_001 and (chunkgroup_time_base_offset of CHUNKGROUP_001+the offset A) is set as title_end_chunk_group_time_stamp of TITLE_001.

In addition, TITLE_002 specifies CHUNKGROUP_001 as a chunk group, a point of time specified by the user as a start time of the title and the end time of CHUNKGROUP_001 as the end time of the title.

That is to say, [chunkgroup_time_base_offset (the start position) of CHUNKGROUP_001+the offset A] is set as title_start_chunk_group_time_stamp of TITLE_002 and [chunkgroup_time_base_offset of CHUNKGROUP_001+the length of CHUNKGROUP_001] is set as title_*end*_chunk_group_time_stamp of TITLE_002.

Furthermore, TITLE_003 specifies CHUNKGROUP_002 as a chunk group, the start time of CHUNKGROUP_002 as a start time of the title and the end time of CHUNKGROUP_002 as the end time of the title.

That is to say, chunkgroup_time_base_offset of CHUNKGROUP_002 is set as title_start_chunk_group_time_stamp of TITLE_003 and [chunkgroup_time_base_offset of CHUNKGROUP_002+the length of CHUNKGROUP_002] is set as title_end_chunk_group_time_stamp of TITLE_003.

In addition, in this example, the program information file named PROGRAM_001.PGI specifies that a portion of TITLE_003 be played back after a portion of TITLE_001. To put it concretely, a title is specified by using title_number of play_item ( ) shown in FIG. 20 and a start time as well as an end time are defined by using times defined in each title. In this way, a cut is extracted. A plurality of such cuts are gathered to form a program.

The following is a description of operations which are carried out when new information is added to the optical disc 1 by performing append recording. In actuality, the append-recording operation is carried out typically to accomplish video recording or when the user operates the input unit 14 to enter a command to perform video recording of data onto the optical-disc apparatus in a real-time manner by using a function of timer video recording. In the latter case, the end time of the video recording can not be known if the user just presses a video-recording button. If the button of a one-touch video-recording function is pressed, however, the end time of the video recording can be estimated. The one-touch video-recording function is a function for carrying out recording for a predetermined period of time starting from the point of time the button is pressed.

Timer video recording is explained as an example as follows.

In this case, the user of the optical-disc apparatus specifies necessary information such as start and end times of the video recording, a bit rate of the bitstream and a channel of the video recording in advance. In addition, at the time the reservation of the video recording is made, it is necessary to confirm in advance that a free area with a size large enough for the specified bit rate and the specified start and end times of the video recording is left in the optical disc 1.

In a period between a time the reservation of the video recording is made and a time the video recording is carried out, another operation to record data onto the optical disc 1 may be carried out. In this case, it is quite within the bounds of possibility that a free area used for recording a program reserved this time at the specified bit rate can no longer be preserved. In this case, the CPU 21 reduces the bit rate to a value smaller than the specified bit rate so as to allow information of the reserved time length to be recorded into the free area or only as much information as accommodatable in the free area is recorded onto the optical disc 1 by keeping the specified bit rate unchanged as it is. In either case, the CPU 21 carries out the reserved video recording operation and, at a point of time a problem is encountered in the reserved video recording, it is needless to say that a message informing the user of the problem is generated.

As time goes by, approaching the start time of the reserved video recording, the CPU 21 automatically restores an operating mode from a sleep mode by using an embedded timer and the clock signal. Then, the CPU 21 uses a file-system operation instruction included in a processing program in advance to secure an area used for recording the reserved program with as large a size as possible on the optical disc 1. A value obtained as a result of multiplication of a recording time by the specified bit rate indicates the size of the area required for recording the reserved program. The recording time is obtained as a result of subtraction of the specified start time of the reserved video recording from the end time. First of all, the CPU 21 secures an area of this size. In addition, if information files other than a stream file are required for the reserved video recording operation, it is necessary to secure also an area with as large a size as required for recording the other information files on the disc 1. Examples of the other information files are a title information file for storing a new title. If an area with a required size can not be secured, a countermeasure such as changing the bit rate or recording only information accommodatable in the free area on the optical disc 1 with the bit rate unchanged is taken to cope with the problem.

It should be noted that, since a new title is recorded at that time, the user gives a name to the new stream file stored on the optical disc 1 as a new stream file under a new stream directory. Assume that the name is ¥MPEGAV¥STREAM_003¥CHUNK_0031. That is to say, a new stream file named CHUNK_0031.MPEG2 is created under a STREAM_003 directory under an MPEGAV directory shown in FIG. 29.

The CPU 21 gives an instruction to execute a recording mode to other components. For example, after a video signal input from a tuner not shown in the figure to the input terminal P3 and an audio signal input to the input terminal P4 are encoded by the encoder 10, results of encoding are stored in the write-channel buffer 11. Subsequently, the CPU 21 moves the optical head 2 to a write position based on address information of the free area secured earlier on the optical disc 1. The CPU 21 then puts the optical head 2, the RF and demodulation/modulation circuit 3 and the ECC circuit 4 in a write mode and, at the same time, changes over the switch 5 to a position connected to the write-channel buffer 6. Furthermore, after finely adjusting the position of the optical head 2, the CPU 21 starts a write operation by using the optical head 2. In this way, contents of newly provided CHUNK_0031.MPEG2 are read out from the write-channel buffer 11 and supplied to the ECC circuit 4 by way of the switch 5. In the ECC circuit 4, error correction codes are added to the contents which are then supplied to the RF and demodulation/modulation circuit 3 to be modulated. A signal output by the RF and demodulation/modulation circuit 3 as a result of the modulation is recorded onto the optical disc 1 by using the optical head 2.

At a time one of the following conditions is satisfied while the CPU 21 is carrying out the write operation described above, the CPU 21 stops the operation:

(1) The end time of the reserved recording operation is reached.

(2) The free area runs out or recording of data onto the optical disc 1 becomes impossible for another reason.

(3) A command to halt the video recording is received.

Subsequently, the CPU 21 uses a file-system operation instruction included in the processing program in advance to update a pointer pointing to CHUNK_0031.MPEG2 in the file system to point to a position at which CHUNK_0031.MPEG2 was newly stored. In addition, the CPU 21 prepares files for storing chunk information, chunkgroup information and title information and records the files by giving names to the files. It should be noted that a free area to be allocated to the files needs to be secured with as large a size as possible at a recording time or reservation time on the optical disc 1.

In this way, new information files like ones shown in FIG. 30 are created. In this figure, the information files newly created this time are each indicated by an asterisk * appended to the right end of the file name.

Figure 31:
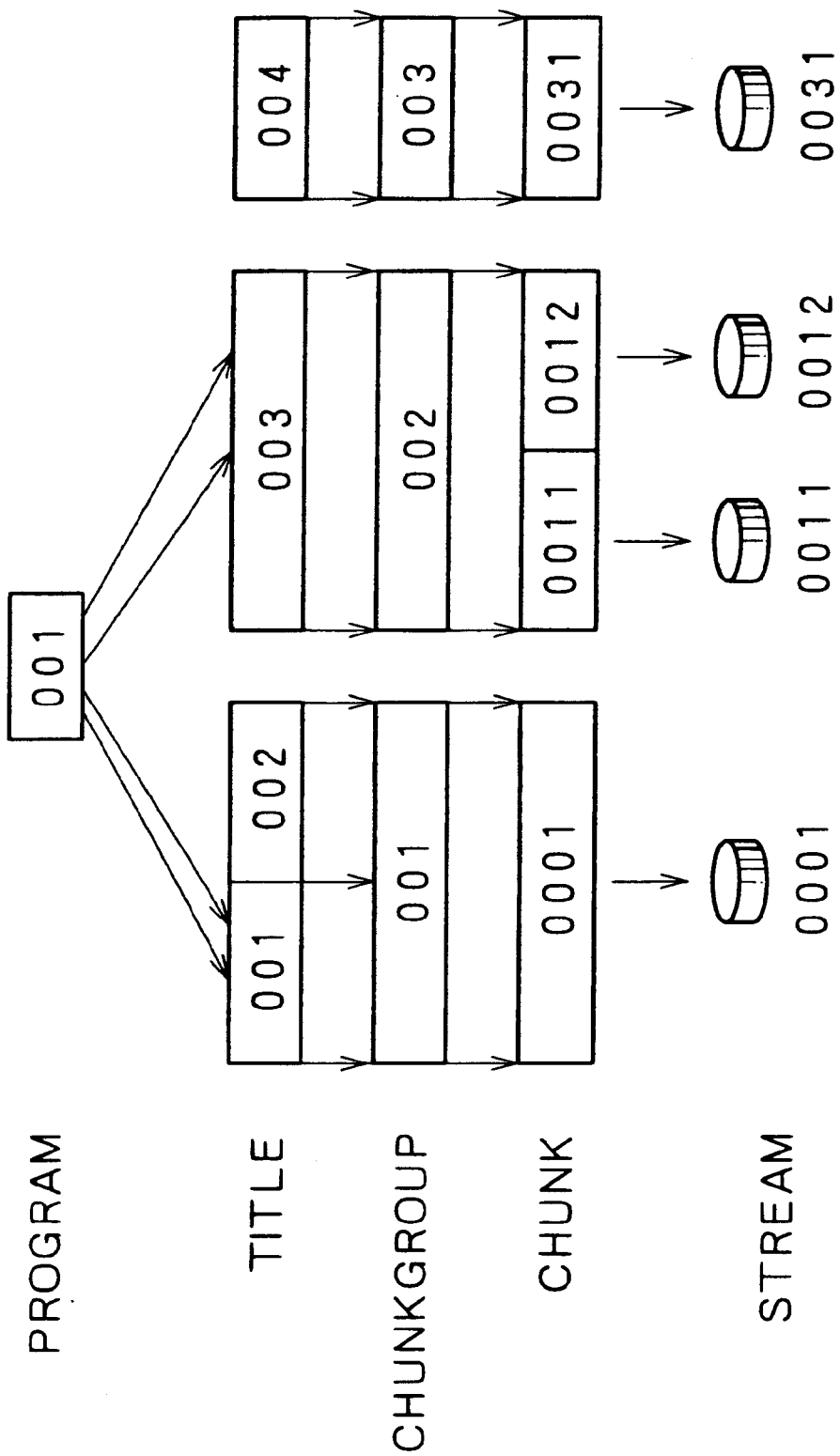
FIG. 31 is an explanatory diagram showing a logical organization of directories.

FIG. 31 is a diagram showing a relation among the newly created information files. As shown in the figure, TITLE_004 specifies CHUNKGROUP_003 which specifies CHUNK_0031. CHUNK_0031 in turn specifies STREAM_0031.

That is to say, a new stream is recorded into an information file named TITLE_004. The user is capable of knowing information such as attributes of TITLE_004 by using a function of the optical-disc apparatus for verifying a title and playing back TITLE_004.

The following is a description of an operation to write information over data already existing on the optical disc 1 shown in FIG. 26 or FIG. 27. Like recording of a video signal, an overwrite-recording operation is an operation to record a new program over an program already existing on the optical disc 1, erasing the existing program.

In an overwrite-recording operation, a position to start the operation is important. Assume that the user specifies an overwrite-recording operation starting from the head of TITLE_001. In the operation, information is written over TITLE_001, TITLE_002 and TITLE_003 sequentially one after another. If the overwrite-recording operation is not finished even when the end of TITLE_003 has been reached, the recording operation is continued by allocating an area in a free area on the optical disc 1. If the overwrite-recording operation is specified with TITLE_002 used as a recording start position, no information is recorded into TITLE_001 since TITLE_001 precedes the recording start position.

Assume that an overwrite-recording operation is started from the beginning of TITLE_003 by timer recording. In this case, the user of the optical-disc apparatus specifies necessary information such as start and end times of the video recording, a bit rate of the bitstream and a channel of the video recording in advance. Assume that the beginning of TITLE_003 is specified as the recording start position which is important for the overwrite-recording operation. In addition, assume that a free area left in the optical disc 1 with a size large enough for the specified bit rate and the specified start and end times of the video recording has been confirmed in advance at the time the reservation of the video recording is made. In an overwrite-recording operation, the sum of the total size of a title (or a plurality of titles) that can be overwritten beginning from the recording start position and the size of a free area left on the optical disc 1 is the size of an overwritable area. To be more specific, in the case of this example, the total size of STREAM_0011 and STREAM_0012 controlled by TITLE_003 and the size of a free area left on the optical disc 1 is the size of an overwritable area.

In an overwrite-recording operation, there are some selections as to what order an actual operation to record information into a recordable area is to be carried out. In the first place, according to a first conceivable method, a recording operation is carried out in an order of streams specified by titles. That is to say, in this example, the recording operation is started from the beginning of STREAM_0011 and, as the end of STREAM_0011 is reached, the recording operation is continued to the beginning of STREAM_0012. As the end of STREAM_0012 is reached, the recording operation is continued to a free area. In another method, a recording operation is started with a free area and, as the free area is all used up, the recording operation is continued to an existing stream.

The former method is better in that recording operation emulates a video-tape. That is to say, the former method is characterized in that the user can understand the recording operation with ease since the recording is the same as the recording operation of a video tape. The latter method is better from the data protection point of view by being characterized in that already recorded streams are erased later after the free recording area is all used up.

It should be noted that, in a period between a time the reservation of the video recording is made and a time the video recording operation is carried out, another operation to record data onto the optical disc 1 may be carried out. In this case, it is quite within the bounds of possibility that a free area used for recording a program reserved this time at the specified bit rate can no longer be preserved. In this case, as described earlier, the CPU 21 automatically reduces the bit rate to a value smaller than the specified bit rate so as to allow information of the reserved time length to be recorded on to the free area or only as much information as accommodatable in the free area is recorded onto the optical disc 1 by keeping the specified bit rate unchanged as it is.

As time goes by, approaching the start time of the reserved video recording, the CPU 21 automatically restores an operating mode from a sleep mode. Then, the CPU 21 secures all free areas on the optical disc 1. It is needless to say that there is also a method of securing a free area at a point of time the area is needed instead of securing a free area at the present point of time. In the following explanation, a required free area is secured before the start of a recording operation.

It should be noted that, since a start time, an end time and a bit rate are specified in timer recording or the like, the size of a needed recording area is known in advance. In this case, an area with a required size or a required size extended by a margin to a certain degree can be secured in advance. In addition, if information files are required for the reserved video recording, it is necessary to secure also an area with as large a size as required for recording the other information files on the disc 1. Examples of other information files are a title information file for storing a new title.

Since a new title is recorded at that time, the user gives a name to the new stream file stored on the optical disc 1 as a new stream file under a new stream directory. Assume that the name is ¥MPEGAV¥STREAM_002¥CHUNK_0031. That is to say, a new stream file named CHUNK_0031.MPEG2 is created under a STREAM_002 directory under an MPEGAV directory as shown in FIG. 32.

Then, a video signal input from the input terminal P3 and an audio signal input from the input terminal P4 are encoded by the encoder 10 before being written into the write-channel buffer 11. Subsequently, the CPU 21 moves the optical head 2 to a write position based on address information of a free area secured on the optical disc 1. The CPU 21 then puts the optical head 2, the RF and demodulation/modulation circuit 3 and the ECC circuit 4 in a write mode and, at the same time, changes over the switch 5 to a position connected to the write-channel buffer 11. Furthermore, after finely adjusting the position of the optical head 2, the CPU 21 starts a write operation by using the optical head 2. In this way, contents of newly provided CHUNK_0031.MPEG2 are read out from the write-channel buffer 11 and supplied to the ECC circuit 4 by way of the switch 5. In the ECC circuit 4, error correction codes are added to the contents which are then supplied to the RF and demodulation/modulation circuit 3 to be modulated. A signal output by the RF and demodulation/modulation circuit 3 as a result of the modulation is recorded onto the optical disc 1 by using the optical head 2.

At that time, first of all, the stream file named CHUNK_0011.MPEG2 is overwritten. As the end of CHUNK_996 0011.MPEG2 is reached, the recording operation is continued to the beginning of CHUNK_0012.MPEG2. As the end of CHUNK_0012.MPEG2 is reached, the recording operation is continued to CHUNK_0031.MPEG2.

At a time one of the 3 conditions described earlier is satisfied while the CPU 21 is carrying out the write operation described above, the CPU 21 stops the operation.

Then, the CPU 21 uses a file-system operation instruction included in the processing program in advance to update a stream file, chunk information, chunk-group information and title information.

By the way, with timing with which the write operation is ended, the organization of files changes. For example, when data is further recorded into CHUNK_0031.MPEG2 after the operation to overwrite the 2 stream files named CHUNK_0001.MPEG2 and CHUNK_0012.MPEG2 have been ended, the organization of files stored in the optical disc 1 changes to that shown in FIG. 33. In this figure, the information files newly created this time are each indicated by an asterisk * appended to the right end of the file name.

FIG. 34 is a diagram showing a relation among the newly created files shown in FIG. 33. A comparison with the relation shown in FIG. 31 clearly indicates that CHUNK_0031 is added as a chunk included in CHUNKGROUP_002 specified by TITLE_003 and CHUNK_0031 specifies STREAM_0031.

If the overwrite-recording operation is completed in the course of writing information over an existing stream, that is, if the overwrite-recording operation is completed in the course of writing information over CHUNK_0011 in this example, the stream of CHUNK_0031 secured for the overwrite-recording operation is released since no data is newly overwritten thereto. In such a case, special title processing is carried out. That is to say, an overwrite-recording operation is started from the beginning of TITLE_003 and, if the operation is completed in a middle thereof, the title is split. To be more specific, an area from the start position of the overwrite-recording operation to the end position is made TITLE_003 and the rest (that is, the remaining portion of TITLE_003) is made TITLE_004 as shown in FIG. 35.

Next, operations to play back a title are explained. Assume that an optical disc 1 containing files like ones shown in FIG. 26 is mounted on the optical-disc apparatus in order to play back a title. First of all, when the optical disc 1 is inserted into the optical-disc apparatus, the CPU 21 fetches information files from the optical disc 1 and stores them into the RAM unit 24. These operations to fetch and store files are just repeated basic operations to read out information files described earlier.

Information files read out first by the CPU 21 are VOLUME.TOC and ALBUM.STR. Then, the CPU 21 examines how many files each having a file-name extension ".VDR" are cataloged under the directory named TITLE. A file having a file-name extension ".VDR" is a file used for storing title information. There are as many such files as titles in the optical disc 1. In the example shown in FIG. 26, the number of titles is 3. The CPU 21 then fetches the 3 title information files and stores them into the RAM unit 24.

Then, the CPU 21 controls the OSD control circuit 9 to generate character information showing title information recorded on the optical disc 1. The character information is synthesized by the synthesis circuit 8 with a video signal, and the synthesized signal is output to the display unit to be displayed thereon by way of the output terminal P1. In this example, there being 3 titles, the length and attributes such as the name and the recording time and date of each of the titles are displayed.

Assume that the user specifies that TITLE_002 be played back, for example. The TITLE_002 information file includes a file ID specifying CHUNKGROUP_001. To be more specific, the file ID is recorded in the cgit_$file$_id field of title_info ( ) shown in FIG. 16. The CPU 21 saves the file ID and stores CHUNKGROUP_001 into the RAM unit 24.

Then, the CPU 21 examines what chunks the start and end times of TITLE_002, that is, title_start_chunk_group_time_stamp and title_end_chunk_group_time_stamp of title_info ( ) shown in FIG. 16 correspond to. The CPU 21 examines corresponding chunks by comparing pieces of information cataloging chunks which are obtained from CHUNKGROUP information with the start and end times. The pieces of information to be compared are presentation_start_cg_time_count and presentation_end_cg_time_count of chunk_arrangement_info ( ) shown in FIG. 23. In this example, the start time of TITLE_002 coincides with a middle point of CHUNK_0001 as is obvious from FIG. 27. That is to say, in order to play back TITLE_002 from the start thereof, it is necessary to play back the CHUNK_0001.MPEG2 stream file from the middle point thereof.

Then, the CPU 21 examines what point on the stream the start of TITLE_002 coincides with. That is to say, the CPU 21 determines by computation what offset time (what time stamp) on the stream the start time of TITLE_002 coincides with, and then identifies a playback start point just before the start time by using characteristic-point information in the CHUNK file. In this way, an offset distance of the playback start point from the start of the file can be confirmed.

Subsequently, the CPU 21 uses a file-system operation instruction included in the processing program in advance to confirm the physical address of CHUNK__0001.MPEG2 on the optical disc 1 and the length thereof. The offset address, at a playback start point, found earlier is further added to this physical address to finally confirm the address of the playback start point of TITLE__002.

Then, the CPU 21 moves the optical head 2 to a read position based on the address information of CHUNK__0001.MPEG2. Subsequently, the CPU 21 puts the optical head 2, the RF and demodulation/modulation circuit 3 and the ECC circuit 4 in a read mode and, at the same time, changes over the switch 5 to a position connected to the read-channel buffer 6. Furthermore, after finely adjusting the position of the optical head 2, the CPU 21 starts a read operation by using the optical head 2. In this way, contents of CHUNK__0001.MPEG2 are read out by the optical head 2 and stored in the read-channel buffer 6.

The data stored in the read-channel buffer 6 is supplied to the decoder 7 to undergo a decoding process for generating video and audio signals. At a point of time the amount of data read out from the optical disc 1, decoded by the decoder 7 and displayed on the display unit becomes equal to the size of CHUNK__001.MPEG2, the CPU 21 transits to an operation to play back information from TITLE__003. The operation to play back information from TITLE__003 is carried out in the same way as the operation to play back information from TITLE__002.

As the operations to play back information from the titles cataloged are completed or when a command to stop a read operation is received, the reading and decoding processes are halted.

It should be noted that, when a new disc is inserted into the optical-disc apparatus as the optical disc 1 or when a disc having a different format is inserted, the CPU 21 makes an attempt to read out VOLUME.TOC and ALBUM.STR from the disc at the time the disc is inserted but these files do not exist in the disc. In such a case, that is, in case VOLUME.TOC and ALBUM.STR can not be read out from the disc, the CPU 21 outputs a message requesting the user to enter a command. In response to the message, the user requests the CPU 21 to eject the optical disc 1 typically if the disc 1 has a different format, to initialize the disc typically if the disc 1 is a new disc having the same format or to restore data by using some methods typically if the disc 1 has the same format but the data thereof has been destroyed.

Next, write protection is explained. A write-inhibit notch shown in none of the figures is provided on the case of the optical disc 1. By properly setting the write-inhibit notch, an overwrite-recording operation of the optical disc 1 can be inhibited. In addition, information on write protection can be recorded on the optical disc 1 as data. To be more specific, information on write protection can be written into write__protect ( ) (shown in FIG. 7) of volume__information ( ) (shown in FIG. 3) of VOLUME.TOC shown in FIG. 2, flags__for__title of title__info ( ) (shown in FIG. 16) of TITLE__###.VDR shown in FIG. 15 or flags__for__program of program ( ) (shown in FIG. 18) of PROGRAM__$$$.PGI shown in FIG. 17.

Write protection is explained by taking write__protect shown in FIG. 7 as an example. write__protect__length of write__protect ( ) shown in FIG. 7 is an area used for recording the length of write__protect ( ). volume__write__protect__level shown in FIG. 36 is an area used for recording information for setting write protection for all titles and programs recorded on the optical disc 1. A level of 0 set in volume__write__protect__level indicates that no write protection is set. That is to say, a level of 0 indicates that an overwrite-recording operation can be carried out on the optical disc 1 with a high degree of freedom. A level of 1 set in volume__write__protect__level indicates that only volume__write__protect__level can be changed. A level of 2 set in volume__write__protect__level indicates that ALBUM.STR and information at lower write-protection levels except level 0 can be changed. A level of 3 set in volume__write__protect__level indicates that VOLUME.TOC and information at lower write-protection levels except level 0 can be changed.

A level of 4 set in volume__write__protect__level indicates that programs and information at lower write-protection levels except level 0 can be changed. A level of 5 set in volume__write__protect__level indicates that titles and information at lower write-protection levels except level 0 can be changed. A level of 6 set in volume__write__protect__level indicates that files having a suffix .MPEG2, .ABST or .CGIT as a file-name extension and information at lower write-protection levels except level 0 can be changed.

password__enable__flag is a flag indicating whether password__for__volume__write__protect to be described later is valid or invalid. With this flag indicating that password__for__volume__write__protect is valid, it is necessary for the user to enter a password recorded in password__for__volume__write__protect in order to change write__protect ( ) or, to put it in detail, to newly create write__protect ( ) or to change or delete the already existing one. append__only__flag is a flag used for limiting the range of changes of write__protect ( ) permitted by volume write__protect__level. That is to say, append__only__flag is a flag used for limiting the range of changes to appending only. Thus, with this flag set, already existing or recorded information can not be changed.

To put it in detail, with append__only__flag reset to a value of 0, write-protect processing can be carried out in accordance with the value of volume__write__protect__level described above as shown in FIG. 37. In this case, write-protect processing can be carried out in the same way as if append__only__flag did not exist. With append__only__flag set to a value of 1, on the other hand, new data can be appended to information within a range defined by the value of volume write__protect__level.

Refer back to write__protect ( ) shown in FIG. 7. expiration__time__enable__flag is a flag indicating whether write__protect__expiration__time ( ) to be described later is valid or invalid. number__of__times__enable__flag is a flag indicating whether number__of__times to be described later is valid or invalid. password__for__volume__write__protect is an area used for recording a password required for changing write__protect ( ).

write__protect__set__time ( ) is an area used for recording a date and a time at which write__protect was set or changed last. Expressed in a BCD format, the date is represented in terms of years, months and days whereas the time is represented in terms of hours, minutes and seconds. write__protect__expiration__time ( ) is an area used for recording a date and a time of a validity limit of the password. Expressed in a BCD format, the date is represented in terms of years, months and days whereas the time is represented in terms of hours, minutes and seconds as is the case with write__protect__set__time ( ). A validity limit can be set for a password. When term of validity of a password has expired, that is, when the validity limit of the password has been reached, write_protect ( ) can be changed even without using the password. The validity limit can be set at an indefinite value.

Figure 38:
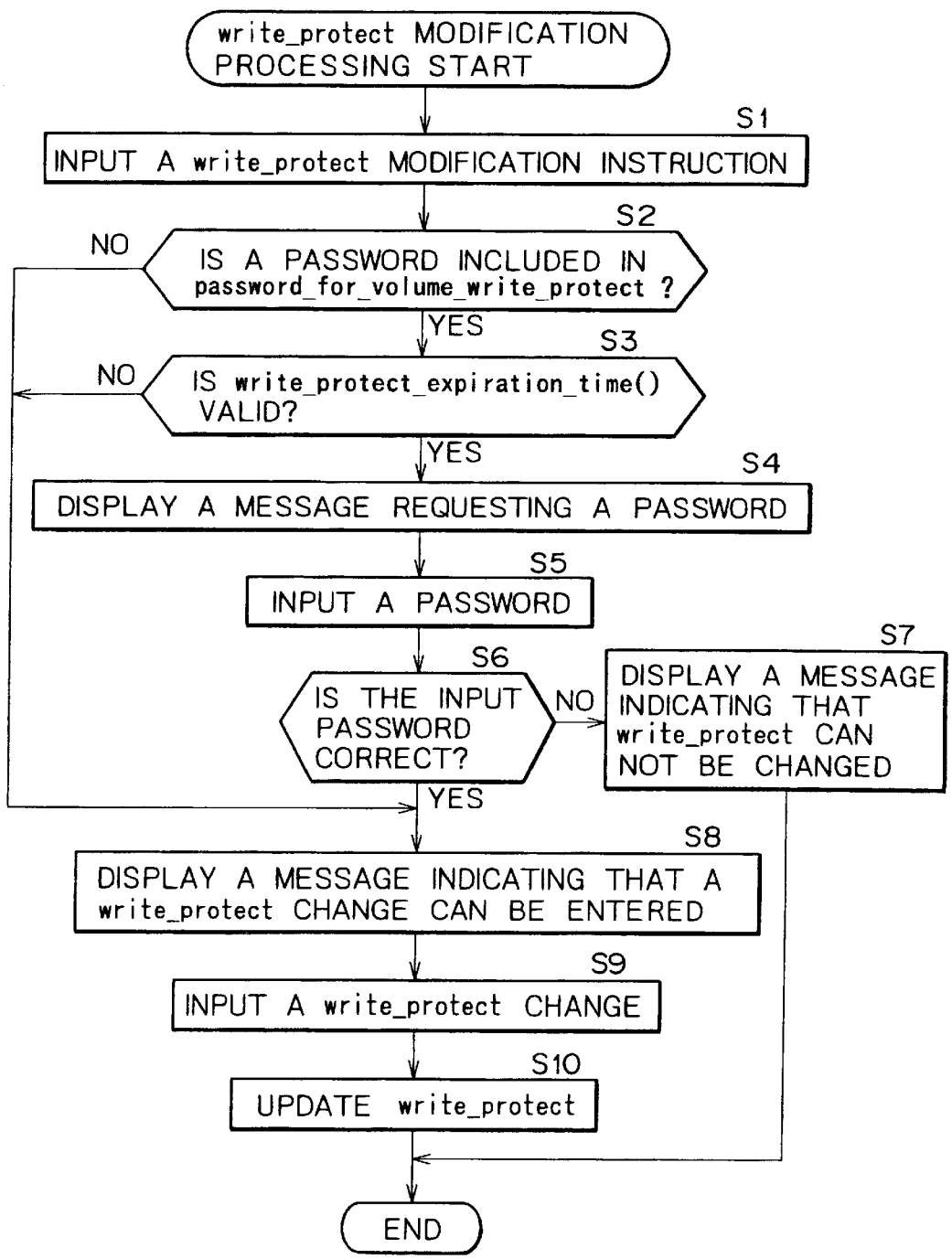
FIG. 38 shows a flowchart representing processing to change write_protect.

Next, processing to change write_protect ( ) is explained by referring to a flowchart shown in FIG. 38. As shown in the figure, the flowchart begins with a step S1 at which the user enters a command to change write_protect ( ) by operating the input unit 14. The flow of the processing then goes on to a step S2 at which the CPU 21 forms a judgment as to whether or not a password has been recorded in password_for_volume write_protect of write_protect ( ) of volume_information ( ) included in VOLUME.TOC stored in the RAM unit 24. If a password has been recorded, the flow of the processing proceeds to a step S3 at which the CPU 21 forms a judgment as to whether write_protection_expiration_time ( ) in write_protect ( ) indicates that the password is valid or invalid at the present time.

As described above, write_protect_expiration_time ( ) is an area used for recording a date and a time of a validity limit of the password. At the step S3, the CPU 21 forms a judgment as to whether or not the present date and time are before the validity limit. If write_protection_expiration_time ( ) in write_protect ( ) indicates that the password is valid at the present time, that is, if the present date and time are before the validity limit, the flow of the processing proceeds to a step S4 at which the CPU 21 controls the OSD control circuit 9 to generate a message for requesting the user to enter a password. The message is output to the display unit to be displayed thereon by way of the synthesis circuit 8 and the output terminal P1. The flow of the processing then proceeds to a step S5 at which the user enters a password by operating the input unit 14 in response to the message.

Then, the flow of the processing proceeds to a step S6 at which the CPU 21 forms a judgment as to whether or not the password entered by the user at the step S5 is a correct password, that is, whether or not the password entered by the user matches the password recorded in password_for_volume_write_protect. If the password entered by the user matches the password recorded in password_for_volume_write_protect, the flow of the processing proceeds to a step S8 at which the CPU 21 controls the OSD control circuit 9 to generate a message for informing the user that write_protect can be changed. The message is output to the display unit to be displayed thereon by way of the synthesis circuit 8 and the output terminal P1.

The flow of the processing then proceeds to a step S9 at which the user enters a change in write_protect ( ) by operating the input unit 14 in response to the message. As the change is entered, the flow of the processing then proceeds to a step S10 at which the CPU 21 modifies write_protect ( ) in accordance with the entered change. To put it in detail, the CPU 21 modifies write_protect ( ) stored in the RAM unit 24 and records the changed data into the optical disc 1.

If the outcome of the judgment formed at the step S6 indicates that the password entered by the user does not match the password recorded in password_for_volume_write_protect, on the other hand, the flow of the processing proceeds to a step S7 at which the CPU 21 controls the OSD control circuit 9 to generate a message for informing the user that write_protect ( ) can not be changed. In this case, the pieces of processing of the steps S8 to S10 are skipped and the user is not allowed to update the contents of write_protect ( ).

If the outcome of the judgment formed at the step S2 indicates that a password has not been recorded in password_for_volume_write_protect or the outcome of the judgment formed at the step S3 shows that write_protection_expiration_time ( ) in write_protect ( ) indicates that the password is invalid at the present time, on the other hand, the flow of the processing proceeds to the step S8 to carry out the processing thereof and the subsequent processing. That is to say, in this case, the user is allowed to update the contents of write_protect ( ) without the need to enter a password.

Figure 41:
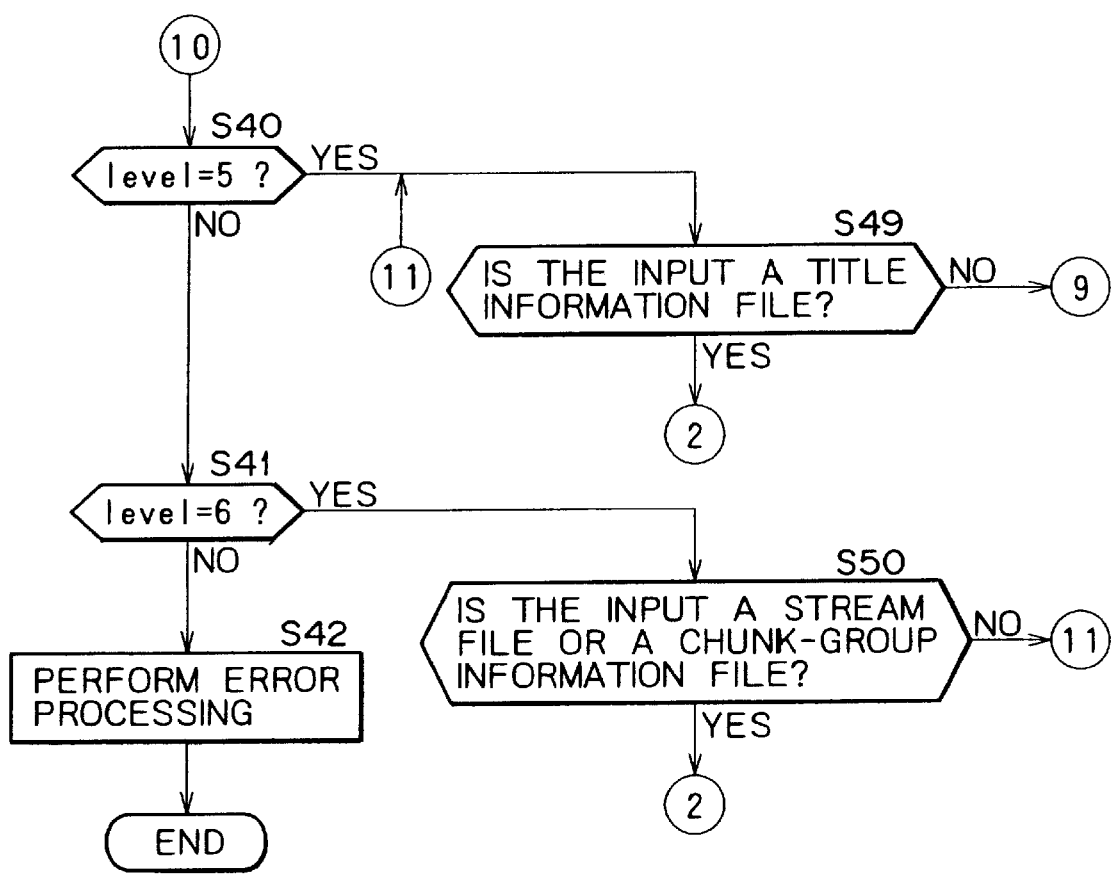
FIG. 41 shows a flowchart representing recording processing.

Next, a recording operation is explained by referring to a flowchart shown in FIGS. 39 to 41. As shown in FIG. 39, the flowchart begins with a step S21 at which the CPU 21 fetches append_only_flag of write_protect ( ) of volume_information ( ) included in VOLUME.TOC stored in the RAM unit 24. The flow of the processing then goes on to a step S22 at which the CPU 21 forms a judgment as to whether or not append_only_flag fetched at the step S21 has a value of 1. If append_only_flag does not have a value of 1, that is, if append_only_flag has a value of 0, the flow of the processing then goes on to a step S34 at which the CPU 21 carries out processing thereof and subsequent processing.

At the step S34, the CPU 21 fetches volume_write_protect_level of write_protect ( ) stored in the RAM unit 24. Then, at steps S35 to S41, the CPU 21 forms a judgment as to whether or not volume_write_protect_level has a value of 0 to 6 respectively.

To put it in detail, if the outcome of the judgment formed at the step S35 indicates that volume_write_protect_level has a value of 0, the flow of the processing goes on to a step S43 at which the CPU 21 carries out recording for the data entered by the user by operating the input unit 14. In this case, the user is allowed to carry out recording with a high degree of freedom since the overwrite-recording operation is not prohibited.

If the outcome of the judgment formed at the step S36 indicates that volume_write_protect_level has a value of 1, the flow of the processing goes on to a step S44 at which the CPU 21 forms a judgment as to whether or not data to be recorded is volume_write_protect_level. As described earlier by referring to FIG. 36, if volume_write_protect_level has a value of 1, the level itself can be updated but other data can not be overwritten. Thus, if the outcome of the judgment formed at the step S44 indicates that data to be recorded is volume_write_protect_level, the flow of the processing goes on to a step S43 at which the CPU 21 overwrites the level. If the outcome of the judgment formed at the step S44 indicates that data to be recorded is not volume_write_protect_level, on the other hand, the flow of the processing goes on to a step S45 at which the CPU 21 controls the OSD control circuit 9 to generate a message for informing the user that recording operation is not permitted. The message is output to the display unit to be displayed thereon by way of the synthesis circuit 8 and the output terminal P1.

If the outcome of the judgment formed at the step S37 indicates that volume_write_protect_level has a value of 2, the flow of the processing goes on to a step S46 at which the CPU 21 forms a judgment as to whether or not data to be recorded is ALBUM.STR. For a level of 2, only ALBUM.STR and volume_write_protect_level at a level lower than ALBUM.STR can be changed. Thus, if the entered data is ALBUM.STR, the flow of the processing goes back to the step S43 at which the CPU 21 carries out recording for the data entered by the user by operating the input unit 14. If the outcome of the judgment formed at the step S46 indicates that the entered data is not ALBUM.STR, on the other hand, the flow of the processing goes back to the step S44 at which the CPU 21 carries out processing thereof and the subsequent processing. That is to say, if the input data is volume_write_protect_level, the recording operation is permitted. If the input data is not volume_write_protect_level, on the other hand, the recording operation is prohibited.

If the outcome of the judgment formed at the step S38 indicates that volume_write_protect_level has a value of 3, the flow of the processing goes on to a step S47 at which the CPU 21 forms a judgment as to whether or not data to be recorded is VOLUME.TOC. For a level of 3, only VOLUME.TOC, ALBUM.STR and volume_write_protect_level can be changed. Thus, if the outcome of the judgment formed at the step S47 indicates that the entered data is VOLUME.TOC, the flow of the processing goes back to the step S43 at which the CPU 21 carries out recording for the data entered by the user by operating the input unit 14. If the outcome of the judgment formed at the step S47 indicates that the entered data is not VOLUME.TOC, on the other hand, the flow of the processing goes back to the step S46 at which the CPU 21 carries out processing thereof and the subsequent processing. That is to say, if the input data is ALBUM.STR or volume_write_protect_level, the recording operation is permitted. If the input data is neither volume_write_protect_level nor ALBUM.STR, on the other hand, the recording operation is prohibited.

If the outcome of the judgment formed at the step S39 indicates that volume_write_protect_level has a value of 4, the flow of the processing goes on to a step S48 at which the CPU 21 forms a judgment as to whether or not data to be recorded is a program information file. For a level of 4, only a program information file, VOLUME.TOC, ALBBUM.STR and volume_write_protect_level can be changed.

Thus, if the outcome of the judgment formed at the step S48 indicates that the entered data is a program information file, the flow of the processing goes back to the step S43 at which the CPU 21 carries out recording for the data entered by the user by operating the input unit 14. If the outcome of the judgment formed at the step S48 indicates that the entered data is not a program information file, on the other hand, the flow of the processing goes back to the step S47 at which the CPU 21 carries out processing thereof and the subsequent processing. That is to say, if the input data is VOLUME.TOC, ALBUM.STR or volume_write_protect_level, the recording operation is permitted. If the input data is neither volume_write_protect_level, VOLUME.TOC nor ALBUM.STR, on the other hand, the recording operation is prohibited.

If the outcome of the judgment formed at the step S40 indicates that volume_write_protect_level has a value of 5, the flow of the processing goes on to a step S49 at which the CPU 21 forms a judgment as to whether or not data to be recorded is a title information file. For a level of 5, only a title information file, a program information file, VOLUME.TOC, ALBUM.STR and volume_write_protect_level can be changed. Thus, if the outcome of the judgment formed at the step S49 indicates that the entered data is a title information file, the flow of the processing goes back to the step S43 at which the CPU 21 carries out recording for the data entered by the user by operating the input unit 14. If the outcome of the judgment formed at the step S49 indicates that the entered data is not a title information file, on the other hand, the flow of the processing goes back to the step S48 at which the CPU 21 carries out processing thereof and the subsequent processing. That is to say, if the input data is a program information file, VOLUME.TOC, ALBUM.STR or volume_write_protect_level, the recording operation is permitted. If the input data is neither volume_write_protect_level, a program information file, VOLUME.TOC nor ALBUM.STR, on the other hand, the recording operation is prohibited.

If the outcome of the judgment formed at the step S41 indicates that volume_write_protect_level has a value of 6, the flow of the processing goes on to a step S50 at which the CPU 21 forms a judgment as to whether or not data to be recorded is a stream file or a chunk-group information file. For a level of 6, only a stream file, a chunk-group information file, a title information file, a program information file, VOLUME.TOC, ALBUM.STR and volume_write_protect_level can be changed. Thus, if the outcome of the judgment formed at the step S50 indicates that the entered data is a stream file or a chunk-group information file, the flow of the processing goes back to the step S43 at which the CPU 21 carries out recording for the data entered by the user by operating the input unit 14. If the outcome of the judgment formed at the step S50 indicates that the entered data is not a stream file or a chunk-group file, on the other hand, the flow of the processing goes back to the step S49 at which the CPU 21 carries out processing thereof and the subsequent processing. That is to say, if the input data is a title information file, a program information file, VOLUME.TOC, ALBUM.STR or volume_write_protect_level, the recording operation is permitted. If the input data is neither volume_write_protect_level, a title information file, a program information file, VOLUME.TOC nor ALBUM.STR, on the other hand, the recording operation is prohibited.

If the outcome of the judgment formed at the step S41 indicates that volume_write_protect_level does not have a value of 6, on the other hand, the flow of the processing goes on to a step S42 at which the CPU 21 carries out error processing. This is because volume_write_protect_level is set at a value in the range 0 to 6 as shown in FIG. 36. A value in the range 7 to 15 is not used for the time being. Thus, for volume_write_protect_level set at a value in the range 7 to 15, error processing is carried out.

If the outcome of the judgment formed at the step S22 indicates that append_only_flag has a value of 1, on the other hand, the flow of the processing goes on to a step S23 at which the CPU 21 fetches volume_write_protect_level. The flow of the processing then goes on to steps S24 to S28 at which the CPU 21 forms a judgment as to whether or not volume_write_protect_level has a value of 0 to 6.

To put it in detail, an outcome of the judgment formed at the step S24 indicating that volume_write_protect_level has a value of 0 can be interpreted to mean that write-protection information is virtually not recorded. In this case, the flow of the processing goes back to the step S43 at which the CPU 21 carries out recording for the data entered by the user by operating the input unit 14.

If the outcome of the judgment formed at the step S25 indicates that volume_write_protect_level has a value of 1, 2 or 3, the flow of the processing goes back to a step S44 at which the CPU 21 forms a judgment as to whether or not data to be recorded is volume_write_protect_level. In this case, volume_write_protect_level having a value of 1, 2 or 3 indicates that only the level itself can be updated but other data can not be overwritten. Thus, if the outcome of the judgment formed at the step S44 indicates that the entered data is volume_write_protect_level, the flow of the processing goes back to the step S43 at which the CPU 21 overwrites the level. If the outcome of the judgment formed at the step S44 indicates that data to be recorded is not volume_write_protect_level, on the other hand, the flow of the processing goes on to a step S45 at which the CPU 21 controls the OSD control circuit 9 to generate a message for informing the user that recording operation is not permitted. This is because ALBUM.STR and VOLUME.TOC are each naturally not data to be appended. Thus, a command to carry out an append-recording operation on ALBUM.STR and VOLUME.TOC is always rejected.

If the outcome of the judgment formed at the step S26 indicates that volume_write_protect_level has a value of 4, the flow of the processing goes on to a step S30 at which the CPU 21 forms a judgment as to whether or not data to be recorded is data of a program information file. If the outcome of the judgment formed at the step S30 indicates that the entered data is not data of a program information file, the flow of the processing goes back to the step S44 at which the CPU 21 forms a judgment as to whether or not data to be recorded is volume_write_protect_level. If the outcome of the judgment formed at the step S44 indicates that the entered data is volume_write_protect_level, the flow of the processing goes back to the step S43 at which the CPU 21 overwrites the level. If the outcome of the judgment formed at the step S44 indicates that data to be recorded is not volume_write_protect_level, on the other hand, the flow of the processing goes on to a step S45 at which the CPU 21 controls the OSD control circuit 9 to generate a message for informing the user that recording operation is not permitted.

If the outcome of the judgment formed at the step S30 indicates that the entered data is data of a program information file, on the other hand, the flow of the processing goes on to a step S31 to form a judgment as to whether or not the recording command is an append command. If the recording command is an append command, the flow of the processing goes back to the step S43 at which the CPU 21 carries out processing to record data of the program information file. If the outcome of the judgment formed at the step S31 indicates that the recording command is not an append command, that is, the recording command is not an overwrite command, on the other hand, the flow of the processing goes back to the step S44 at which the CPU 21 carries out processing thereof and the subsequent processing.

If the outcome of the judgment formed at the step S27 indicates that volume_write_protect_level has a value of 5, the flow of the processing goes on to a step S32 at which the CPU 21 forms a judgment as to whether or not data to be recorded is data of a title information file. If the outcome of the judgment formed at the step S32 indicates that the entered data is data of a title information file, the flow of the processing goes back to the step S31 to form a judgment as to whether or not the recording command is an append command. If the recording command is an append command, the flow of the processing goes back to the step S43 at which the CPU 21 carries out processing to record data of the title information file. If the outcome of the judgment formed at the step S31 indicates that the recording command is not an append command, on the other hand, the flow of the processing goes back to the step S44 at which the CPU 21 carries out processing thereof and the subsequent processing.

If the outcome of the judgment formed at the step S32 indicates that the entered data is not data of a title information file, on the other hand, the flow of the processing goes back to the step S30 at which the CPU 21 carries out processing thereof and the subsequent processing.

If the outcome of the judgment formed at the step S28 indicates that volume_write_protect_level has a value of 6, the flow of the processing goes on to a step S33 at which the CPU 21 forms a judgment as to whether or not data to be recorded is data of a stream information file or a chunk-group information file. If the outcome of the judgment formed at the step S33 indicates that the entered data is not data of a stream information file or a chunk-group information file, the flow of the processing goes back to the step S32 at which the CPU 21 carries out processing thereof and the subsequent processing. If the outcome of the judgment formed at the step S33 indicates that the entered data is data of a stream information file or a chunk-group information file, on the other hand, the flow of the processing goes back to the step S31 at which the CPU 21 carries out processing thereof and the subsequent processing.

If the outcome of the judgment formed at the step S28 indicates that volume_write_protect_level does not have a value of 6, on the other hand, the flow of the processing goes on to a step S29 at which error processing is carried out.

Figure 42:
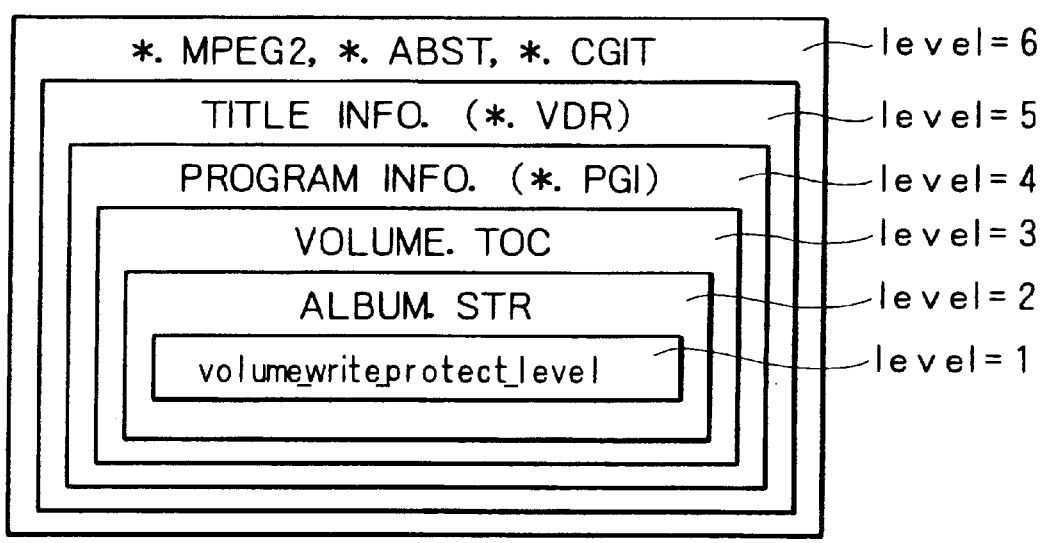
FIG. 42 is an explanatory diagram showing a relation among write-protection levels of a volume.

FIG. 42 is a diagram showing a relation among write-protection levels of the volume described above. The relation shown in the figure can be interpreted that, at each level, information at the level itself and at inner levels can be updated or overwritten. However, data at outer levels can not be updated.

write_protect ( ) has been explained so far. Similar information on write protection is also recorded in flags_for_title and flags_for_program and similar write-protection processing is carried out.

It should be noted that control to inhibit a write operation is executed in accordance with a logical sum of a write inhibit notch provided on the case of the optical disc 1 and pieces of information on write protection recorded in write_protect ( ) of VOLUME.TOC, flags_for_title and flags_for_program. That is to say, even if only bone of the notch and the pieces of information indicates that a write operation is prohibited, a write operation can not be carried out.

An application of the present invention to an optical-disc apparatus has been explained so far. It should be noted that the present invention can also be applied to operations to record and play back information onto and from other recording media.

It should be noted that, as presentation media for presenting a computer program to be executed for carrying out the processing described above to the user, communication media such as a network and a satellite can be used in addition to a magnetic disc, a CD-ROM and a recording medium such as solid-state memory.

As described above, according to a recording apparatus as in claim 1, a recording method as in claim 4 and a presentation medium as in claim 5, control of an operation to record data onto a recording medium is executed in accordance with a specification result specifying whether or not an append-recording operation of data is prohibited. Thus, an append-recording operation may be permitted even if an overwrite-recording operation is prohibited. As a result, it is possible to prevent data from being deleted inadvertently by preventing a recording operation from being carried out by mistake and to use the recording area of a recording medium efficiently by carrying out a recording operation to append new data into a free area of the recording medium.

According to a recording medium as in claim 6, information to be appended is recorded, making it possible to implement a recording medium that can be used efficiently and is capable of avoiding incorrect deletion of data.

What is claimed is:

1. A recording apparatus comprising:
   a removable recording medium;
   a volume write protection section provided on said removable recording medium for storing write protection information specifying whether or not a recording operation to said recording medium is allowed;
   an append-recording specifying means provided within said volume write protection section for specifying whether or not a recording operation to append data to a recording medium is allowed;
   a specification judging means for forming a judgment on a specification indicated by said append-recording specifying means; and
   a control means for controlling an operation to record data onto said recording medium in accordance with a result of a judgment formed by said specification judging means.

2. A recording apparatus according to claim 1 wherein said apparatus further has a recording prohibition/permission specifying means for specifying whether an operation to record data onto said recording medium is prohibited or permitted for each data type and said append-recording specifying means specifies whether an append-recording operation is prohibited or permitted within a range specified by said recording prohibition/permission specifying means.

3. A recording apparatus according claim 1 wherein said control means includes a means for forming a judgment as to whether or not an append-recording operation is allowed in accordance with information specifying whether or not an operation to append data recorded onto said recording medium is allowed.

4. A recording method comprising:
   an append recording specifying step of specifying by use of an append-recording specifying flag, provided in a volume write protection section of a removable recording medium, whether or not a recording operation to append data to said removable recording medium is allowed;
   a specification judging step of forming a judgment on a specification indicated at said append recording specifying step; and
   a control step of controlling an operation to record data onto said recording medium in accordance with a result of a judgment formed at said specification judging step.

5. A presentation method used for presenting a program to be executed by a recording apparatus for carrying out processing, said method including:
   an append recording specifying step of specifying by use of an append-recording specifying flag, provided in a volume write protection section of a removable recording medium, whether or not a recording operation to append data to said removable recording medium is allowed;
   a specification judging step of forming a judgment on a specification indicated at said append recording specifying step; and
   a control step of controlling an operation to record data onto said recording medium in accordance with a result of a judgment formed at said specification judging step.

6. A recording medium which data is recorded onto and played back from, whereby said recording medium is removable and includes a volume write protection section for storing write protection information, including an append-recording specifying flag, specifying whether or not a recording operation to append data to said removable recording medium is allowed.

* * * * *